(12) United States Patent
Mosca et al.

(10) Patent No.: US 12,198,002 B2
(45) Date of Patent: Jan. 14, 2025

(54) SYSTEM AND METHOD FOR OPTIMIZING QUANTUM CIRCUIT SYNTHESIS

(71) Applicant: Michele Mosca, Waterloo (CA)

(72) Inventors: Michele Mosca, Waterloo (CA);
Priyanka Mukhopadhyay, Waterloo (CA)

(73) Assignee: Michele Mosca, Waterloo (CA)

( * ) Notice: Subject to any disclaimer, the term of this patent is extended or adjusted under 35 U.S.C. 154(b) by 607 days.

(21) Appl. No.: 17/304,421

(22) Filed: Jun. 21, 2021

(65) Prior Publication Data
US 2021/0406753 A1 Dec. 30, 2021

Related U.S. Application Data

(60) Provisional application No. 62/705,294, filed on Jun. 19, 2020.

(51) Int. Cl.
*G06F 30/30* (2020.01)
*G06F 30/20* (2020.01)
(Continued)

(52) U.S. Cl.
CPC .............. *G06N 10/00* (2019.01); *G06F 30/20* (2020.01); *G06F 2115/10* (2020.01)

(58) Field of Classification Search
CPC ........ G06N 10/00; G06N 10/20; G06F 30/20; G06F 2115/10
See application file for complete search history.

(56) References Cited

U.S. PATENT DOCUMENTS

| 11,049,038 | B2 * | 6/2021 | Chen ....................... G06N 10/00 |
| 11,308,252 | B1 * | 4/2022 | Piveteau ................. G06F 30/39 |
| 2022/0164505 | A1 * | 5/2022 | Mosca ................... G06N 10/20 |

OTHER PUBLICATIONS

Aaronson, Scott and Gottesman, Daniel; Improved simulation of stabilizer circuits; Physical Review A, 70(5):052328, 2004.
(Continued)

*Primary Examiner* — Jack Chiang
*Assistant Examiner* — Brandon Bowers
(74) *Attorney, Agent, or Firm* — CPST Intellectual Property Inc.; Brett J. Slaney; Filip Boskovic

(57) ABSTRACT

A method is provided for synthesizing quantum circuits while reducing the T-count, comprising, for a plurality of qubits: determining a target unitary and executing a set of candidate operations W with a single T gate and computing a specific function f of U $W^{-1}$ keeping the values of W that correspond to specific multiplicities such that after the first collection of W operators is selected a collection of unitaries U $W^{-1}$ is determined to consider in the next round to build a tree. A method of synthesizing quantum circuits while reducing the T-depth is also provided, comprising, for a plurality of qubits: determining a target unitary and execute a set of candidate operations W with T depth of one and computing a specific function f of U $W^{-1}$, keeping the values of W that correspond to specific multiplicities such that after the first collection of W operators is selected a collection of unitaries U $W^{-1}$ is determined to consider in the next round to build a tree. A method of re-synthesizing quantum circuits while reducing T-depth is also provided, comprising, for a plurality of qubits considering all cluster sizes up to a maximum sized cluster, and continuing recursively.

20 Claims, 9 Drawing Sheets

(51) Int. Cl.
  *G06N 10/00* (2022.01)
  *G06F 115/10* (2020.01)

(56) References Cited

OTHER PUBLICATIONS

Aliferis, Panos; Gottesman, Daniel and Preskill, John; Quantum accuracy threshold for concatenated distance-3 codes; Quantum Information & Computation, 6(2):97-165, 2006.
Amy, Matthew; Maslov, Dmitri and Mosca, Michele; Polynomial-time t-depth optimization of clifford+ t circuits via matroid partitioning; IEEE Transactions on ComputerAided Design of Integrated Circuits and Systems, 33(10):1476-1489, 2014.
Amy, Matthew; Maslov, Dmitri; Mosca, Michele, and Roetteler, Martin; A meet-in-themiddle algorithm for fast synthesis of depth-optimal quantum circuits; IEEE Transactions on Computer-Aided Design of Integrated Circuits and Systems, 32(6):818-830, 2013.
Abdessaied, Nabila; Soeken, Mathias, and Drechsler, Rolf; Quantum circuit optimization by hadamard gate reduction; In International Conference on Reversible Computation, pp. 149-162. Springer, 2014.
Bombin, Héctor; Andrist, Ruben S.; Ohzeki, Masayuki; Katzgraber, Helmut G; and Martín-Delgado, Miguel A.; Strong resilience of topological codes to depolarization; Physical Review X, 2(2):021004, 2012.
Bravyi, Sergey and Kitaev, Alexei; Universal quantum computation with ideal clifford gates and noisy ancillas; Physical Review A, 71(2):022316, 2005.
Bocharov, Alex ; Roetteler, Martin and Svore, Krysta M.; Efficient synthesis of universal repeat-until-success quantum circuits. Physical review letters, 114(8):080502, 2015.
Britton, Joseph W., Sawyer, Brian C., Keith Adam C.; Wang, C-C Joseph; Freericks, James K.; Uys, Hermann; Biercuk, Michael J. and Bollinger, John J.; Engineered two dimensional ising interactions in a trapped-ion quantum simulator with hundreds of spins; Nature, 484(7395):489, 2012.
Brown, Kenton R.; Wilson, Andrew C.; Colombe, Yves; Ospelkaus, C.; Meier, Adam M.; Leibfried, E. Knill D. and Wineland, David J.; Single-qubit-gate error below 10-4 in a trapped ion; Physical Review A, 84(3):030303, 2011.
Chow, Jerry M. et al.; Universal quantum gate set approaching fault-tolerant thresholds with superconducting qubits; Physical review letters, 109(6):060501, 2012.
De Beaudrap, Niel; Bian, Xiaoning and Wang, Quanlong; Techniques to reduce π/4 parity phase circuits, motivated by the zx calculus; arXiv preprint arXiv:1911.09039, 2019.
Di Matteo, Olivia and Mosca, Michele; Parallelizing quantum circuit synthesis; Quantum Science and Technology, 1(1):015003, 2016.
Fowler, Austin G.; Whiteside, Adam C. and Hollenberg, Lloyd CL; Towards practical classical processing for the surface code; Physical review letters, 108(18):180501, 2012.
Gottesman, Daniel and Chuang, Isaac L.; Quantum teleportation is a universal computational primitive; arXiv preprint quant-ph/9908010, 1999.
Gosset, David; Kliuchnikov, Vadym; Mosca, Michele and Russo, Vincent; An algorithm for the t-count. arXiv preprint arXiv:1308.4134, 2013.

Gottesman, Daniel; The heisenberg representation of quantum computers; preprint quant-ph/9807006, 1998. arXiv.
Giles, Brett and Selinger, Peter; Exact synthesis of multiqubit clifford+ t circuits; Physical Review A, 87(3):032332, 2013.
Jones, Cody; Low-overhead constructions for the fault-tolerant toffoli gate; Physical Review A, 87(2):022328, 2013.
Kitaev, A Yu; Fault-tolerant quantum computation by anyons; Annals of Physics, 303(1):2-30, 2003.
Kliuchnikov, Vadym; Synthesis of unitaries with clifford+ t circuits; arXiv preprint arXiv:1306.3200, 2013.
Kliuchnikov, Vadym; Maslov, Dmitri and Mosca, Michele; Fast and efficient exact synthesis of single qubit unitaries generated by clifford and t gates; arXiv preprint arXiv:1206.5236, 2012.
Kliuchnikov, Vadym; Maslov, Dmitri and Mosca, Michele; Asymptotically optimal approximation of single qubit unitaries by clifford and t circuits using a constant number of ancillary qubits; Physical review letters, 110(19):190502, 2013.
Kliuchnikov, Vadym; Maslov, Dmitri and Mosca, Michele; Fast and efficient exact synthesis of single-qubit unitaries generated by clifford and t gates; Quantum Information & Computation, 13(7-8):607-630, 2013.
Le Gall, François; Powers of tensors and fast matrix multiplication7; In Proceedings of the 39th international symposium on symbolic and algebraic computation, pp. 296-303. ACM, 2014.
Maslov, Dmitri; Advantages of using relative-phase toffoli gates with an applicationto multiple control toffoli optimization; Physical Review A, 93(2):022311, 2016.
Paetznick, Adam and Reichardt, Ben W.; Universal fault-tolerant quantum computation with only transversal gates and error correction; Physical review letters, 111(9):090505, 2013.
Paetznick, Adam and Svore, Krysta M.; Repeat-until-success: nondeterministic decomposition of single-qubit unitaries; Quantum Information & Computation, 14(1516):1277-1301, 2014.
Rigetti, Chad et al; Superconducting qubit in a waveguide cavity with a coherence time approaching 0.1 ms; Physical Review B, 86(10):100506, 2012.
Ross, Neil J. and Selinger, Peter; Optimal ancilla-free clifford+ t approximation of z rotations; Quantum Information & Computation, 16(11-12):901-953, 2016.
Selinger, Peter; Quantum circuits of t-depth one; Physical Review A, 87(4):042302, 2013.
Selinger, Peter, Efficient clifford+ t approximation of single-qubit operators; Quantum Information & Computation, 15(1-2):159-180, 2015.
Shor, Peter W.; Algorithms for quantum computation: Discrete logarithms and factoring; In Proceedings 35th annual symposium on foundations of computer science, pp. 124-134. Ieee, 1994.
Shor, Peter W.; Polynomial-time algorithms for prime factorization and discrete logarithms on a quantum computer. SIAM review, 41(2):303-332, 1999.
Gheorghiu, Vlad; Mosca, Michele and Mukhopadhyay, Priyanka; A quasi-polynomial time heuristic algorithm for synthesizing T-depth optimal circuits, arXiv preprint arXiv:2101.03142, 2021.
Mosca, Michele and Mukhopadhyay, Priyanka; A polynomial time and space algorithm for t-count.arXiv preprint arXiv:2006.12440, 2020.
Ozols, Maris; Clifford group; Essays at University of Waterloo, Spring, 2008.

\* cited by examiner

Algorithm 1: Nested MITM

Input: (i) A unitary $U$, (ii) a gate set $\mathcal{G}$, (iii) depth $d$, (iv) $c \geq 2$
Output: A decomposition (if it exists) of $U$ as depth at most $d$ circuit 1   $S_0 \leftarrow \{\mathbb{I}\}$ ;
2   $i \leftarrow 1$ ;
3   while $i \leq \lceil \frac{d}{c} \rceil$ do
4     $S_i \leftarrow \mathcal{V}_n \cdot S_{i-1}$ ;
5     for $k = 1, 2, \ldots, c-1$ do
6       for $V = V_1 V_2 \ldots V_k$ where $V_i \in S_i$ or $V_i \in S_{i-1}$ do
7         if $\exists W \in S_i$ such that $V^\dagger U = W$ then
8           return $V_1 V_2, \ldots, V_k, W$ ;
9           break ;
10         end
11         else if $\exists W \in S_{i-1}$ such that $V^\dagger U = W$ then
12           return $V_1 V_2, \ldots, V_k, W$ ;
13           break ;
14         end
15       end
16     end
17 end
18 if no decomposition found then
19    return "$U$ has depth more than $d$." ;
20 end

FIG. 7

Algorithm 2: DECIDE T-DEPTH

Input: (i) $\tilde{U}$ where $\tilde{U} \in \mathcal{J}_n$ and (ii) integer $d' > 0$
Output: Decomposition $\tilde{U} = \left(\prod_{i=d}^{1} R(P)\right) \tilde{C}_0$ if minimum T-depth at most $d'$, else NO 1  Compute sets $V_{a,j}^{-1}$ for $j = 1, 2, \ldots, n$.    // Can pre-processing ;
2  $\text{Path}_{\tilde{U}} \leftarrow []$ ;
3  $\tilde{U} = [\tilde{U}, \text{Path}_{\tilde{U}}, \text{sde}_{\tilde{U}}, \text{ham}_{\tilde{U}}]$    // Stores root node ;
4  $\mathcal{U}_0 = \{\tilde{U}\}$    // Subscript indicates path T-count ;
5  for $i = 1, 2, \ldots, d'$ do
6    for $k = i - 1, \ldots, n(i - 1)$ do    // Parent hypernodes// do
7      for $\tilde{U} \in \mathcal{U}_k$ do    // Each node within a hypernode// do
8        Multiply $\tilde{U}$ by unitaries in $V_{a,j}^{-1}$ for $j = 1, 2, \ldots, n$ ;
9        In an array store the number of product unitaries with a certain sde and change (increase, decrease or unchanged) in Hamming weight ;
10       In a separate array for each product unitary store the information about path (from root), sde and Hamming weight change ;
11     end
12   end
13   Determine the minimum cardinality set ($G$) of product unitaries such that their sde is at most $n(d' - i)$    // Nodes which can lead to Clifford;
14   for $\tilde{U} \in G$ do
15     If $\text{sde}_{\tilde{U}} == 0$ then
16       $\tilde{C}_0 = \tilde{U}$ ;
17       return $\text{Path}_{\tilde{U}}, \tilde{C}_0$ as the decomposition of $\tilde{U}$ and $i$ as its depth ;
18       break ;
19     else
20       $\tilde{U}' = [\tilde{U}', \text{Path}_{\tilde{U}'}, \text{sde}_{\tilde{U}'}, \text{ham}_{\tilde{U}'}]$    // Build children node ;
21       $\mathcal{U}_k.\text{append}(\tilde{U}')$, where $k$ is the path T-count of $\tilde{U}'$    // Store in hypernodes ;
22     end
23   end
24   for $k = i, \ldots, ni$ do
25     Delete parent nodes in $\mathcal{U}_k$ ;
26   end
27   Delete all other parent hypernodes;
28 end
29 If No Clifford reached then
30   return NO ;
31 end

FIG. 9

Algorithm 3: MIN T-DEPTH

Input: $\hat{U}$ where $U \in \mathcal{J}_n$
Output: $d$, the minimum T-depth of $U$ and its decomposition $\hat{U} = \left(\prod_{i=d}^{1} \widehat{R(P)}\right) \hat{C}_0$ 1  $d' = \left\lceil \frac{\text{sde}_\gamma}{n} \right\rceil$ ;
2  while 1 do
3      DECIDE T-DEPTH($\hat{U}, d'$) ;
4      if *Returns NO* then
5         $d' \leftarrow d' + 1$ ;
6      else
7         return the obtained decomposition and depth ;
8         break ;
9      end
10 end

FIG. 10

SYSTEM AND METHOD FOR OPTIMIZING QUANTUM CIRCUIT SYNTHESIS

CROSS REFERENCE TO RELATED APPLICATIONS

This application claims priority to U.S. Provisional Application No. 62/705,294, filed Jun. 19, 2020. The contents of U.S. Provisional Application No. 62/705,294 are incorporated by reference herein.

TECHNICAL FIELD

The following relates generally to optimizing a quantum circuit synthesis, in particular to minimizing T-count and/or optimizing T-depth of such a quantum circuit.

BACKGROUND

Circuit synthesis and optimization is a significant part of any computer compilation process whose primary goal is to translate from a human readable input (programming language) into instructions that can be executed directly on hardware. As with classical computers this is also true for quantum computers, which can solve problems believed to be classically intractable, like integer factorization [Sho99, Sho94]. In quantum circuit synthesis the aim is to decompose an arbitrary unitary operation into a sequence of gates from a universal set, which usually consists of Clifford group gates and at least one more non-Clifford gate. Often the synthesis task comes with additional requirements like minimizing a particular gate.

In order to deal with errors due to noise on quantum information, faulty quantum gates, faulty quantum state preparation, faulty measurements, a fault-tolerant design is needed, for which a process of quantum error correction is important. In particular, for long computations, where the number of operations in the computation vastly exceeds the number of operations one could hope to execute before errors make negligible the likelihood of obtaining a useful answer, fault-tolerant quantum error correction is the only known way to reliably implement the computation. To achieve universality, a non-Clifford gate is required [Got98, AG04]. As the non-Clifford T gate has known constructions in most of the common error correction schemes, the standard universal fault-tolerant gate set is taken to be "Clifford+T" and {H, T, CNOT} is a minimal generating set for it.

Most of the popular fault tolerant schemes implement Clifford group gates transversally, allowing the logical operations to be performed precisely and with time proportional to the physical gate time. The non-Clifford gates, however, require large ancilla factories and additional operations like gate teleportation and state distillation [BK05, GC99]. These are less accurate procedures which require both additional time and space compared to a single physical gate. In fact, the cost of fault tolerant implementation of the T gate [FSG09, AGP06] exceeds the cost of the Clifford group gates by as much as a factor of one hundred or more. While alternative fault-tolerance methods such as completely transversal Clifford+T scheme [PR13] and anyonic quantum computing [Kit03] are gaining in popularity, minimization of the number of T gates in quantum circuits remain an important and widely studied goal. With recent advances in quantum information processing technologies [BSK+12, BWC+11, CGC+12, RGP+12] and fault-tolerant thresholds [BAO+12, FSG09, FWH12], as scalable quantum computation is becoming more and more viable efficient automated design tools targeting fault-tolerant quantum computers are needed.

SUMMARY

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

Quantum circuit synthesis algorithms can be broadly divided into two classes: those that synthesize approximately and others that synthesize exactly. Some of these work for single qubit unitaries, while others have been generalized to multiple qubits. An n-qubit unitary can be implemented using the Clifford+T gate set if and only if its matrix elements are in the ring $\mathbb{Z}[i,1/\sqrt{2}]$ [GS13, KMM13b]. Additionally, if its determinant satisfies a certain condition [GS13] then it belongs to the group $J_n$ of unitaries implementable without ancillae. For example, the Toffoli and Fredkin gates belong to $J_3$. An algorithm for exactly synthesizing unitaries over the Clifford+T gate set was given in [GS13] and a superexponentially faster version of this algorithm was given in [Kli13].

In this specification, the group $(J_n^a)$ of unitaries are addressed, which unitaries can be exactly synthesized (both with and without ancilla) and the following problem:

Given $U \in J_n^a$, compute a T-optimal n-qubit quantum circuit for it.

The T-count of U is defined to be the minimum number of T gates in a Clifford+T circuit that implements it (up to a possible global phase) and is denoted by T(U). In other words, T(U) is the minimum m for which:

$$e^{i\phi}U = C_m T_{(q_m)} C_{m-1} T_{(q_{m-1})} \cdots T_{(q_1)} C_0 \qquad (1)$$

where $\phi \in [0, 2\pi)$, $C_i$ are in the n-qubit Clifford group, $q_i \in \{1, 2, \ldots, n\}$ and $T_{(r)}$ indicates the T gate acting on the $r^{th}$ qubit.

The T-count of a unitary U may change with the use of additional ancilla qubits and/or measurements with classically controlled operations. For example, Jones [Jon13] has shown how to perform a Toffoli gate using these additional ingredients and only 4 T gates, while the T-count of this unitary without these is 7 [GKMR13]. In this description case ancilla qubits are the only extra resources allowed.

The depth of a circuit is the length of any critical path through the circuit. Representing a circuit as a directed acyclic graph with nodes corresponding to the circuit's gates and edges corresponding to gate inputs/outputs, a critical path is a path of maximum length flowing from an input of the circuit to an output.

A circuit of depth one over n qubits is obtained by combining gates from a fixed set, each acting on different qubits. Thus, an n qubit circuit C has depth at most m if it corresponds to some sequence of unitaries U1 U2 ... Um where U1, U2, ..., Um are depth one n-qubit circuits over a fixed set of gates. Additionally, it can be stated that C implements a n-qubit unitary U if U1 U2 ... Um=U. The T-depth of a circuit is the number of stages (or unitaries Ui) where the T gate is the only non-Clifford gate.

While T-count is a major contributor to the overall size of a quantum computation, another meaningful cost to optimize, with a focus on minimizing the time required to execute the circuit, would be the T-depth of the circuit.

The process for utilizing a quantum computer starts with outlining a high-level algorithm that implicitly or explicitly outlines a sequence of operations to be executed on the quantum hardware. One of the most fundamental operations to be executed consist of unitary transformations. A description of these unitary transformations is input to a computing device that translates them into lower-level transformations. There are often several layers of translation down to a description of physical operations that can be directly applied to the quantum computing device. In order to minimize the amount of physical resources (such as time and quantum memory) needed to implement a specific unitary, methods for translating, or compiling, the unitaries into a more efficient sequence of lower-level operations are sought.

The lower-level operations have some intrinsic costs. Quantum circuit synthesis and optimization seeks to minimize the total cost of the lower-level operations needed to implement the input unitary.

A general approach for improving exhaustive methods for decomposing an operation is known as meet-in-the-middle, and this has been used for quantum circuit synthesis. In this description, a method and system are described which may reduce the memory requirement of meet-in-the-middle circuit synthesis by recursively applying the meet-in-the-middle method.

The special properties needed for the nesting approach include:

1. The problem has a sort of recursive structure. An instance of the problem, that is, for a particular value of one of the inputs (say count or depth), can be sub-divided into a number of instances with a smaller value of this input. Each such sub-division is a recursion.

2. Necessary information for solve one of the recursions (base) is stored. The other instances should be able to be solved with this information. That is, a bigger instance can be solved from many smaller instances.

3. The memory requirement is dictated by whatever is stored in the base recursion. Storing anything for the other recursions is avoided. This reduces memory requirements associated with the nesting approach.

4. The time increases because some computations may be performed repeatedly by not storing information for other recursions. So, it is important to assure that this blow-up is not too high.

While these methods are rigorous, the resources required by the computing devices performing the circuit synthesis tend to grow exponentially and quickly become infeasible to implement in practice. Beyond the rigorous methods introduced, heuristic algorithms are also presented which may be employed to perform quantum circuit synthesis and optimization using exponentially fewer resources.

In the following, a new approach is presented to quickly synthesize quantum circuits while reducing the T-count or the T-depth. The presented methods exploit subtle mathematical properties of the unitary operators to be synthesized. In the one-qubit case, there is a simple and elegant property, known as sde, that goes up by exactly one at every step as the T-count of a circuit is increased.

More specifically, consider a unitary U that can be decomposed into n components, $W_1, W_2, \ldots, W_n$, such that $U=W_1 W_2 \ldots W_n$, and where each $W_j$ uses exactly one T gate. Consider the partial products $U_j=W_1 W_2 \ldots W_j$ (so $U_1=W_1$, and $U_0=I$, the identity). So $U_j$ has T-count j. The sde of the partial product $U_j$ increases by 1 over the sde of $U_{j-1}$, and thus equals j.

So, to optimally synthesize a one-qubit circuit (in terms of T-count), a method can include starting with the target unitary U and trying all candidate operations W with exactly one T gate until the operation $W_n$ is found such that $U W_n^{-1}$ reduces the sde by 1.

And then iterate, and peel off the layers one by one, until the identity is reached. Once the relation $U W_n^{-1} W_{n-1}^{-1} \ldots W_1^{-1} = I$, is determined, then it is concluded that $U=W_1 W_2 \ldots W_n$.

However, for 2 qubits or more, this is not the case anymore. The optimal paths from the target unitary, peeling off layers of T gates, until the identity is discovered, has the sde go up, go down, or stay the same, in a hard-to-predict way. In other words, a T-count j unitary U on 2 or more qubits does not in general have sde j. It will often have a much lower sde, so the simple approach that works with 1 qubit does not necessarily work.

A more sophisticated approach to identify which operations W should be selected to eventually result in $U W_n^{-1} W_{n-1}^{-1} \ldots W_1^{-1} = I$ is presented. Furthermore, the approach does not need to reduce to the identity, but any Clifford operation, since Clifford operations also have T-count equal to 0.

The following approach goes well beyond looking at just the sde. For a candidate W, a more complex function of $U W^{-1}$ is computed. The example functions defined depend on sde ($U W^{-1}$) and the Hamming weight of $U W^{-1}$. For example, if the sde and Hamming weight both decrease from U to $U W^{-1}$, the function f evaluates to one specific value. If the sde increases and Hamming weight decreases, f evaluates to another specific value. And so on.

Next, the multiplicities of all the output values of the function f over all the candidate W operations are looked at. Then the values of W that correspond to specific multiplicities are kept. In some example embodiments, the lowest non-zero multiplicity is chosen. So, all values of W such that $f(U W^{-1})$ corresponds to the output with the lowest non-zero multiplicity is kept.

So, after the first collection of W operators is selected, a collection of unitaries $U W^{-1}$ is retained to consider in the next round. So instead of discovering a single path (as in the 1-qubit case) a tree is being built.

The tree will get pruned, as outlined below, which reduces the overall cost of implementing the algorithm. In experimental testing, the size of the tree does not demonstrate growth that is exponential in the dimension of the unitary being synthesized and in the T-count.

A similar approach is applied to T-depth, with some modifications.

In one aspect, there is provided a method of synthesizing quantum circuits while reducing the T-count, comprising, for a plurality of qubits: determining a target unitary and executing a set of candidate operations W with a single T gate and computing a specific function f of $U W^{-1}$ keeping the values of W that correspond to specific multiplicities such that after the first collection of W operators is selected a collection of unitaries $U W^{-1}$ is determined to consider in the next round to build a tree.

In another aspect, there is provided a method of synthesizing quantum circuits while reducing the T-depth, comprising, for a plurality of qubits: determining a target unitary and execute a set of candidate operations W with T depth of one and computing a specific function f of $U W^{-1}$, keeping the values of W that correspond to specific multiplicities such that after the first collection of W operators is selected a collection of unitaries $U W^{-1}$ is determined to consider in the next round to build a tree.

In yet another aspect, there is provided a method of re-synthesizing quantum circuits while reducing T-depth, comprising, for a plurality of qubits considering all cluster sizes up to a maximum sized cluster, and continuing recursively.

In yet another aspect, there is provided a computer readable medium comprising computer executable instructions for performing the methods above.

In yet another aspect, there is provided a system for synthesizing or re-synthesizing quantum circuits comprising a processor and memory, the memory comprising computer executable instructions for performing the methods above.

In another aspect, there is provided a method of synthesizing a quantum circuit for a plurality of qubits, comprising initializing one or more target unitaries (U) as one or more input unitaries. One or more subsequent target unitaries are iteratively determined by executing a set of candidate operations W having a T-gate property via a channel representation function f of U W for each of the one or more target unitaries, selecting one or more subsequent target unitaries based on values of the channel representation function f which satisfy one or more multiplicity criteria, and updating the one or more target unitaries to include the one or more subsequent target unitaries.

According to example embodiments, the candidate operations W are inverses of channel representations ($W^{-1}$), and the T-gate property is one of having a single T-gate or having a T-depth of one.

In some example embodiments, for example, the one or more multiplicity criteria are defined by function f values grouped by: ($sde(U\ W^{-1})$ increases, Hamming weight increases), ($sde(U\ W^{-1})$ increases, Hamming weight decreases), ($sde(U\ W^{-1})$ decreases, Hamming weight increases), ($sde(U\ W^{-1})$ decreases, Hamming weight decreases), ($sde(U\ W^{-1})$ is unchanged, Hamming weight decreases), ($sde(U\ W^{-1})$ is unchanged, Hamming weight increases), ($sde(U\ W^{-1})$ is unchanged, Hamming weight is unchanged).

In some example embodiments, for example, the one or more multiplicity criteria are defined by function f values grouped by one or both of $sde(U\ W^{-1})$ and Hamming weights, and wherein the one or more subsequent target unitaries are selected based on function f value groups with a minimum cardinality.

In some example embodiments, for example, the one or more subsequent target unitaries are determined for a target unitary count number of iterations, and the one or more subsequent target unitaries are selected based on function f value groups with $sde(U\ W^{-1})$ values that can reduce to zero for the remaining iterations.

In some example embodiments, for example, the method further comprises determining $sde(U\ W^{-1})$ values that can reduce to zero for the remaining iterations by subtracting the remaining number of iterations from the target unitary count number.

According to example embodiments, the one or more multiplicity criteria are defined by function f values grouped by: ($sde(U\ W^{-1})$ increases), ($sde(U\ W^{-1})$ decreases) and ($sde(U\ W^{-1})$ is unchanged).

According to example embodiments, the one or more multiplicity criteria are defined by function f values grouped by: ($sde(U\ W^{-1})$ increases, Hamming weight increases), ($sde(U\ W^{-1})$ increases, Hamming weight decreases), ($sde(U\ W^{-1})$ decreases, Hamming weight increases), ($sde(U\ W^{-1})$ decreases, Hamming weight decreases), ($sde(U\ W^{-1})$ is unchanged, Hamming weight decreases), ($sde(U\ W^{-1})$ is unchanged, Hamming weight increases)).

According to example embodiments, the set of candidate operations W is computed in time $O(N4/2)$, where N is a dimension of the set of candidate operations W, and the set of candidate operations W are determined at least in part by copying half the rows of a respective candidate unitary matrix V, and the remaining N2/2 rows of the respective set of candidate operations W are determined by a component-wise addition or subtraction and multiplication among pairs of rows of the respective candidate unitary matrix V.

According to example embodiments, the one or more target unitaries are stored as a ring representation in a tuple along with a sde value associated with the respective one or more target unitaries.

According to example embodiments, the quantum circuit comprises Clifford and Tgate sets arranged according to the one or more target unitaries.

A yet another aspect, a system for synthesizing or re-synthesizing quantum circuits is presented. The system comprises a processor and memory, the memory comprising computer executable instructions that when executed by the processor, cause the processor to initialize one or more target unitaries (U) as one or more input unitaries, and recursively determine one or more subsequent target unitaries. The target one or more subsequent target unitaries are determine by executing a set of candidate operations W having a T-gate property via a channel representation function f of U W for each of the one or more target unitaries, selecting one or more subsequent target unitaries based on values of the channel representation function f which satisfy one or more multiplicity criteria, and updating the one or more target unitaries to include the one or more subsequent target unitaries.

According to example embodiments, the candidate operations W are inverses of channel representations ($W^{-1}$), and the T-gate property is one of having a single T-gate or having a T-depth of one.

According to example embodiments, the one or more multiplicity criteria are defined by function f values grouped by: ($sde(U\ W^{-1})$ increases), ($sde(U\ W^{-1})$ decreases) and ($sde(U\ W^{-1})$ is unchanged).

According to example embodiments the one or more multiplicity criteria are defined by function f values grouped by: ($sde(U\ W^{-1})$ increases, Hamming weight increases), ($sde(U\ W^{-1})$ increases, Hamming weight decreases), ($sde(U\ W^{-1})$ decreases, Hamming weight increases), ($sde(U\ W^{-1})$ decreases, Hamming weight decreases), ($sde(U\ W^{-1})$ is unchanged, Hamming weight decreases), ($sde(U\ W^{-1})$ is unchanged, Hamming weight increases)).

According to example embodiments the one or more multiplicity criteria are defined by function f values grouped by: ($sde(U\ W^{-1})$ increases, Hamming weight increases), ($sde(U\ W^{-1})$ increases, Hamming weight decreases), ($sde(U\ W^{-1})$ decreases, Hamming weight increases), ($sde(U\ W^{-1})$ decreases, Hamming weight decreases), ($sde(U\ W^{-1})$ is unchanged, Hamming weight decreases), ($sde(U\ W^{-1})$ is unchanged, Hamming weight increases), ($sde(U\ W^{-1})$ is unchanged, Hamming weight is unchanged).

According to example embodiments the one or more multiplicity criteria are defined by function f values grouped by one or both of $sde(U\ W^{-1})$ and Hamming weights, and wherein the one or more subsequent target unitaries are selected based on function f value groups with a minimum cardinality.

According to example embodiments the one or more subsequent target unitaries are determined for a target unitary count number of iterations, and the one or more subsequent target unitaries are selected based on function f value groups with $sde(U\ W^{-1})$ values that can reduce to zero for the remaining iterations.

According to example embodiments, the system further comprises instructions to determine sde(U W$^{-1}$) values that can reduce to zero for the remaining iterations by subtracting the remaining number of iterations from the target unitary count number.

According to example embodiments, the set of candidate operations W is computed in time O(N4/2), where N is a dimension of the set of candidate operations W, and the set of candidate operations W are determined at least in part by copying half the rows of a respective candidate unitary matrix V, and the remaining N2/2 rows of the respective set of candidate operations W are determined by a component-wise addition or subtraction and multiplication among pairs of rows of the respective candidate unitary matrix V.

According to example embodiments, one or more target unitaries are stored as a ring in a tuple along with a sde value associated with the respective one or more target unitaries.

In yet another aspect, a computer readable medium (CRM) comprising computer executable instructions for synthesizing a quantum circuit for a plurality of qubits is presented. The CRM comprises instructions for initializing one or more target unitaries (U) as one or more input unitaries, iteratively determining one or more subsequent target unitaries by executing a set of candidate operations W having a T-gate property via a channel representation function f of U W for each of the one or more target unitaries, selecting one or more subsequent target unitaries based on values of the channel representation function f which satisfy one or more multiplicity criteria, and updating the one or more target unitaries to include the one or more subsequent target unitaries.

BRIEF DESCRIPTION OF THE DRAWINGS

Embodiments will now be described with reference to the appended drawings wherein:

FIG. 7 illustrates Algorithm 1, a nested MITM.

FIG. 9 illustrates Algorithm 2, which shows an example algorithm to decide a T-depth of a circuit.

FIG. 10 illustrates Algorithm 3, which shows an example algorithm to minimize a T-depth of a circuit.

DETAILED DESCRIPTION

Quantum Computing System

Figure 1:
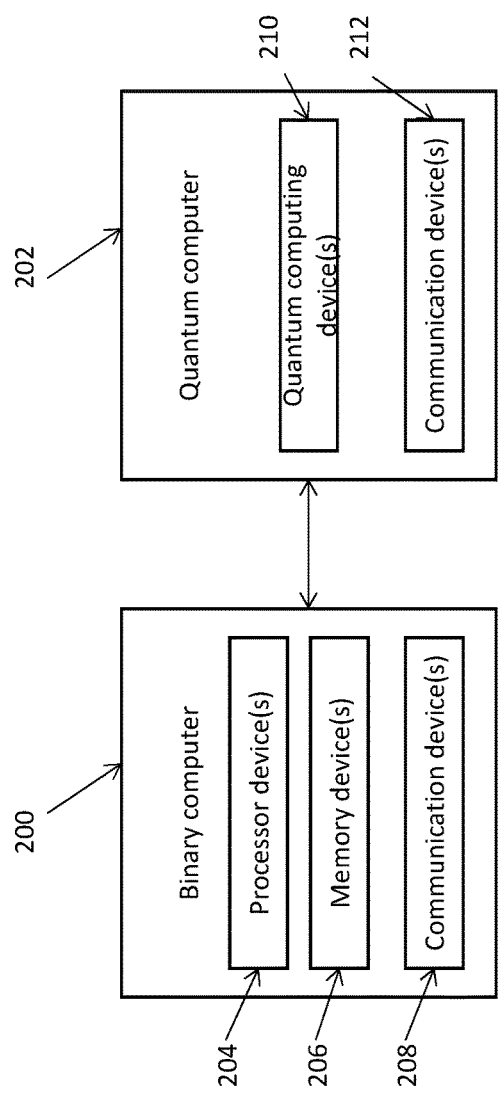
FIG. 1 is a schematic diagram of a binary computer and a quantum computer.

In an example embodiment shown in FIG. 1, a system includes a binary computer 200 that is in data communication with a quantum computer 202. The binary computer includes one or more processor devices 204, one or more memory devices 206 and one or more communication devices 208. The processor 204 and the memory 206 include currently known and future known digital technologies. The quantum computer 202 includes one or more quantum computing devices 210 and one or more communication devices 212. In an example embodiment, the physical implementation of the quantum computing device is reconfigurable to generate different quantum circuits. It will be appreciated that currently and future known quantum computing devices that can implement different quantum circuits are applicable to the principles described herein.

Using the system of FIG. 1, a binary input representing an initial quantum circuit is received by the binary computer 200 and is stored in memory 206. By performing the computations on the binary computer via the processor(s) 204 according to the methods described herein, the binary computer is able to generate and output a binary file that represents a new quantum circuit that has a lower circuit cost, e.g., in terms of T-count and/or T-depth, compared to the initial quantum circuit, but still has the same function. This binary file representing the new quantum circuit is transmitted to the quantum computer 202. The quantum computer 202 then uses the received binary file to adjust the parameters of the quantum computing devices to perform the new quantum circuit. In other words, the quantum computer executes physical CNOT and transformations in accordance with the binary form of the new quantum circuit.

It should be noted that, while some of the methods and systems disclosed have been described in the abstract language of mathematics, the current application is directed towards the production of tangible, physical representations of efficient quantum circuits. For example, in one embodiment of the methods disclosed, the optimization procedures are performed by a computer program designed to be run on a conventional computer. The input and output are circuits stored in an appropriate binary format in the physical memory—for example, a magnetic-disk (hard disk)—of the computer. Such a physical representation of a quantum circuit in an electronic storage medium may then later be used to implement the operation with a particular quantum computing technology. Examples of applicable quantum . . . computing technology include a classical simulator for quantum computing technology or a hybrid classical/quantum device. For example, the digital representation of the optimized circuit as a sequence of CNOT, T, P, and Z gates may be used to determine a sequence of physical pulses needed to perform the operation on a quantum computer using topological quantum error correcting codes running on superconducting qubits. Alternatively, the operations may be performed by a series of pulses and other physical operations on a quantum computer consisting of trapped ions, or spin qubits in silicon, or nitrogen vacancy qubits in diamond, or qubits encoded in topologically ordered states of matter, or other realizations and variations, including hybrid devices.

Figure 2:
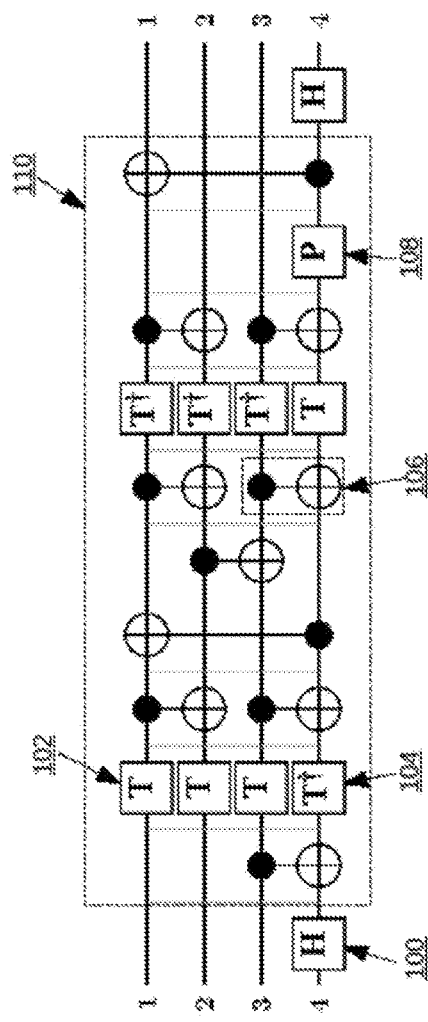
FIG. 2 is a graphical representation of an example of a quantum circuit.

Quantum circuits are an analog of classical circuits which are used to describe quantum computations in terms of smaller quantum operations. In a quantum circuit, wires carry qubits to gates, which transform their state according to some unitary matrix. Quantum circuits are typically displayed as a graph with horizontal lines representing qubits and labeled boxes representing the application of gates to sets of qubits. As a convention quantum circuits are run from left to right. FIG. 2 gives one such example of a graphical representation of a quantum circuit. 100, 102, 104, 106 and 108 are all quantum gates, while the boxed area 110 is a subcircuit of the entire circuit. 106 represents the two-qubit controlled-NOT gate, also called a CNOT gate, defined as.

$$CNOT = \begin{bmatrix} 1 & 0 & 0 & 0 \\ 0 & 1 & 0 & 0 \\ 0 & 0 & 0 & 1 \\ 0 & 0 & 1 & 0 \end{bmatrix}$$

The other gates shown are defined below.

$$H = \frac{1}{\sqrt{2}}\begin{bmatrix} 1 & 1 \\ 1 & -1 \end{bmatrix}, T = \begin{bmatrix} 1 & 0 \\ 0 & e^{i\frac{\pi}{4}} \end{bmatrix}, P = T^2, T^1 = T^{-1} = T^7.$$

Given a particular, possibly infinite, set of gates, a circuit $\mathcal{G} = \{G_1, G_2, \ldots\}$ over $\mathcal{G}$ is a quantum circuit in which only the gates found in $\mathcal{G}$ are used. Such a set of gates is referred to as a gate set or basis.

Quantum circuits may also include other features such as measurements or classical control; such features are irrelevant to this application and are not described, but it is appreciated that the present invention applies to quantum circuits which may make use of such features. Additionally, while quantum circuits and computation are described here in the language of mathematics, it is understood that these function as a formalism for physical computations that are performed on a quantum computer, and that the object of invention applies to these physical computations. For example, a quantum circuit represented in some format, either as a drawing or in a suitable binary format may be mapped, by hand or by an automated tool, into a sequence of individual instructions for a quantum computer. In this way, the object of invention applies to the efficient operation of physical quantum computing hardware.

T-Count Minimization

This specification in part considers the following problem.

Problem 1.1 (COUNT-T or COUNT-T (optimization)). Given $U \in J_n^a$ determine its T-count.

The decision version of this problem is as follows:

Problem 1.2 (COUNT-T (decision)). Given $U \in J_n^a$ and $m \in \mathbb{N}$, decide if $T(U) \le m$.

It has been shown in [GKMR13] that an algorithm which computes $T(U)$ can be converted into an algorithm which outputs a T-optimal circuit for U, with overhead polynomial in $T(U)$ and the dimension of U.

In this section the complexity of COUNT-T as a function of m and $N = 2^n$ and in the RAM model is considered. Arithmetic operations on the entries of U are treated at unit cost, and the bit-complexity associated with specifying or manipulating them is not accounted for.

Given is a provable algorithm for COUNT-T (decision) having space complexity $O(N^{2\lceil m/c \rceil} \text{poly}(m,N))$ (where $c \ge 2$) and time complexity $O(N^{2(c-1)\lceil m/c \rceil} \text{poly}(m,N))$. The meet-in-the-middle algorithm of [GKMR13] has a space and time complexity of $O(N^m \text{poly}(m,N))$. Thus, the described scheme matches the space×time complexity, and importantly allows for a full space×time trade-off.

Also given is a heuristic algorithm for COUNT-T (optimization) with both space and time complexity $O(\text{poly}(N, T(U)))$, thus (partly) answering a question left open in [GKMR13]. The described heuristic algorithm was tested on some circuits whose T-count is known such as 3-qubit Toffoli, Fredkin and Peres gate (FIGS. 11A to 11C) and 4 qubit 1-bit reversible full adder (FIG. 12). All of them gave an optimal T-count 7, thus confirming what was already known [AMMR13, GKMR13, DMM16]. But the proposed algorithm is much faster and with much less storage requirement. For example, it gives the T-count (and a partial circuit) of the 4-qubit adder in about 6 minutes with 8 processors. In comparison the current fastest parallel algorithm in [DMM16] takes about 12.5 hours with 4096 processors. Here it is noted that the presented heuristic algorithm is a serial algorithm. Experiments were conducted and some larger 4-qubit circuits like U1=(TOF⊗⊗)(⊗&TOF) [AMMR13] (FIG. 5) and U2=(TOF⊗⊗)(⊗⊗TOF)(TOF⊗⊗) (FIG. 6) were implemented, where TOF is the 3-qubit Toffoli gate. If a T-count optimal circuit for Toffoli was implemented, a T-count 14 and 21 respectively would have been found. The T-par algorithm in [AMMR13] obtains a T-count 12 for $U_1$. Instead, T-count 11 and 7 respectively was obtained in time about 2.2 hours and 6.5 minutes respectively with the algorithms described herein.

The details of both these algorithms can be found in Section 4 and 5.

An important part of reaping computational advantage from a quantum computer is to reduce the quantum resources needed to implement a desired quantum algorithm. Quantum algorithms that are too large to be practical on noisy intermediate scale quantum (NISQ) devices will require fault-tolerant error correction This work focuses on reducing the physical cost of implementing quantum algorithms when using the state-of-the-art fault-tolerant quantum error correcting codes, in particular, those for which implementing the T gate consumes vastly more resources than the other gates in the gate set.

More specifically this description considers the group of unitaries that can be exactly implemented by a quantum circuit consisting of the Clifford+T gate set. The Clifford+T gate set is a universal gate set and in this group the T gate is a very expensive component to implement fault tolerantly. So, it is important to minimize the number of T gates necessary for a fault-tolerant implementation. The primary interest is to compute a circuit for a given n-qubit unitary U, using the minimum possible number of T gates (called the T-count of U). The problem is denoted by COUNT-T, the optimization version of which aims to find the T-count of U. In its decision version the goal is to decide if the T-count is at most some positive integer m. Given an oracle for COUNT-T, it is possible to compute a T-optimal circuit in time polynomial in the T-count and dimension of U. A provable classical algorithm that solves COUNT-T (decision) in time $O(N2(c-1)\lceil m/c \rceil \text{poly}(m,N))$ and space $O(N2\lceil m/c \rceil \text{poly}(m,N))$, where $N=2^n$ and $c \ge 2$ is described. A heuristic algorithm that solves COUNT-T (optimization) with both space and time $O(\text{poly}(m,N))$ is also described. The heuristic algorithm was implemented with 3 and 4 qubit unitaries and obtained a significant improvement in time as well as T-count.

1.2. Related Work

The meet-in-the-middle technique was first used by Amy et al. [AMMR13] to reduce T-depth (primarily) in the decomposition of unitaries that can be implemented exactly. Their algorithm was extended by Gosset et al. [GKMR13] to directly optimize T-count, leading to proofs of T-count minimality for various 3 qubit circuits. Selinger [Sel13] showed that a general class of Clifford+T circuits can be parallelized to T-depth 1 with sufficiently many ancillas. Using similar ideas and the concept of matroid partitioning, Amy, Maslov, Mosca [AMM14] created an automated, polynomial time tool for reducing and parallelizing T gates called T-par. However, their heuristic algorithm does not compute T-count exactly. Abdessaied et al. [ASD14] studied the effect of Hadamard gates on T-count and depth reductions, developing a tool that reduces Hadamard gates in quantum circuits leading to further T gate optimizations. Maslov [Mas16] developed new designs for multiple control Toffolis using fewer ancillas, CNOT and in some cases T gates. Di Matteo and Mosca [DMM16] constructed a parallel framework using deterministic walks for performing optimal T-count synthesis and confirmed that the 4-qubit 1-bit full adder has optimal T-count 7 and T-depth 3. Like the other exact synthesis algorithms, the running time of this parallel algorithm is exponential in the number of qubits as well as depth of the circuit. The problem of reducing T-count with the help of ZX calculus has also been studied [dBBW19] and in some cases it gives better results than previously known ones.

Much work has been done to optimize T-count and depth in exact [KMM12, KMM13b] and approximate [KMM13a, Sel15, RS16] synthesis of single qubit circuits, as well as repeat-until-success circuits [PS14, BRS15].

1.3. Organization

Necessary preliminaries and notations are provided in Section 2. Some results about channel representation of unitaries have been given in Section 3. The provable and heuristic algorithms have been given in Section 4 and 5, respectively. Finally, Section 6 is a conclusion.

2. Preliminaries

Assume $N=2^n$ and $[K]=\{1, 2, \ldots, K\}$. The $(i, j)^{th}$ entry of any matrix M is denoted by $M_{ij}$ or $M_{i,j}$ or M [i,j]. The $i^{th}$ row of M is denoted by M [i,.] and the $j^{th}$ column by M [.,j]. The n×n identity matrix is denoted by $\mathbb{I}_n$ or $\mathbb{I}$ if the dimension is clear from the context.

The number of non-zero entries in a matrix is called its Hamming weight.

2.1. Cliffords and Paulis

The single qubit Pauli matrices are as follows:

$$X = \begin{bmatrix} 0 & 1 \\ 1 & 0 \end{bmatrix} Y = \begin{bmatrix} 0 & -i \\ i & 0 \end{bmatrix} Z = \begin{bmatrix} 1 & 0 \\ 0 & -1 \end{bmatrix} \quad (2)$$

Parenthesized subscripts are used to indicate qubits on which an operator acts. For example, $X_{(1)}=X \otimes \mathbb{I}^{\otimes(n-1)}$ implies that Pauli X matrix acts on the first qubit and the remaining qubits are unchanged.

The n-qubit Pauli operators are:

$$P_n = \{Q_1 \otimes Q_2 \otimes \ldots Q_n : Q_i \in \{\mathbb{I}, X, Y, Z\}\} \quad (3)$$

The single-qubit Clifford group $C_1$ is generated by the Hadamard and phase gate.

$$C_1 = \langle H, S \rangle \quad (4)$$

Where:

$$H = \frac{1}{\sqrt{2}} \begin{bmatrix} 1 & 1 \\ 1 & -1 \end{bmatrix} S = \begin{bmatrix} 1 & 0 \\ 0 & i \end{bmatrix} \quad (5)$$

When n>1 the n-qubit Clifford group $c_n$ is generated by these two gates (acting on any of the n qubits) along with the two-qubit CNOT=$|0\rangle\langle 0| \otimes \mathbb{I} + |1\rangle\langle 1| \otimes X$ gate (acting on any pair of qubits).

Cliffords map Paulis to Paulis up to a possible phase of −1 i.e. for any $P \in P_n$ and any $C \in C_n$ it is $CPC^\dagger = (-1)^b P'$ for some $b \in \{0, 1\}$ and $P' \in P_n$. In fact, given two Paulis (neither equal to the identity), it is always possible to efficiently find a Clifford which maps one to the other.

Fact 2.1 ([GKMR13]). For any P, $P' \in P_n \setminus \{\mathbb{I}\}$ there exists a Clifford $C \in C_n$ such that $CPC^\dagger = P'$. A circuit for C over the gate set {H, S, CNOT} can be computed efficiently (as a function of n).

2.2. The Group $J_n$ Generated by Clifford and T Gates

The group $J_n$ is generated by the n-qubit Clifford group along with the T gate, where:

$$T = \begin{bmatrix} 1 & 0 \\ 0 & e^{i\frac{\pi}{4}} \end{bmatrix} \quad (6)$$

Thus, for a single qubit: $J_1 = \langle H, T \rangle$ and for n>1 qubits $$J_n = \langle H_{(i)}, T_{(i)}, CNOT_{(i,j)} : i,j \in [n] \rangle.$$

It can be easily verified that $J_n$ is a group, since the H and CNOT gates are their own inverses and $T^{-1}=T^7$. Here it is noted $S=T^2$.

The group of unitaries exactly synthesized over the Clifford+T gate set is denoted by $J_n^a$. Some elements of this group cannot be exactly synthesized over this gate set without ancilla qubits.

The following characterization of this group was proved by Giles and Selinger [GS13].

Theorem 2.1. Let U(N) (where N=2n) is the Group of n-Qubit Unitaries.

1. (Theorem 1 from [GS13])

An element U in U(N) can be exactly represented by a quantum circuit over the Clifford+T gate set if each of its entry is an element of $\mathbb{Z}[i,1/\sqrt{2}]$. At most one ancilla is always sufficient to implement U.

2. (Corollary 2 from [GS13])

Furthermore, U can be implemented without ancilla if $\det(U) = e^{i(\pi/8)Nr}$ for some $r \in [8]$. For n at least 4 the condition on the determinant is simply $\det(U)=1$.

2.3. Channel Representations

An n-qubit unitary U can be completely determined by considering its action on a Pauli $P_s \in P_n$: $P_s \to UP_s U^\dagger$. The set of all such operators (with $P_s \in P_n$) completely determines U up to a global phase. Since $P_n$ is a basis for the space of all Hermitian N×N matrices it can be written:

$$UP_s U^\dagger = \sum_{P_r \in P_n} \hat{U}_{rs} P_r, \quad (7)$$

Where:

$$\hat{U}_m = \frac{1}{2^n} Tr(P_r U P_s U^\dagger) \quad (8)$$

This defines a $N^2 \times N^2$ matrix $\hat{U}$ with rows and columns indexed by Paulis $P_r, P_s \in P_n$. $\hat{U}$ is referred to as the channel representation of U.

By Hermitian conjugation, each entry of the matrix $\hat{U}$ is real. The channel representations respect matrix multiplication. Setting $V=U^\dagger$ it follows that $\hat{U}$ is unitary.

Lemma 2.1. Let V and U be $N_1 \times N_1$ and $N_2 \times N_2$ unitaries, respectively. Then the channel representation of $(V \otimes U)$ is product of the channel representation of V and U.

Let $U \in J_n^a$ and $|\phi\rangle$ and $|\psi\rangle$ are the ancilla and input state, respectively. To be specific, U' is the unitary that acts on the joint state space of ancilla and input qubits. For tensor product inputs:

$$U'(|\phi\rangle \otimes |\psi\rangle) = V|\phi\rangle \otimes U|\psi\rangle = (V \otimes U)(|\phi\rangle \otimes |\psi\rangle)$$

Since the product states span the entire state space, $U' = V \otimes U$. So, from Lemma 2.1 a channel representation of U' from $\hat{U}$ and channel representation of V can be calculated:

$$\hat{U}' = \hat{V} \otimes \hat{U}$$

Note in many cases the ancilla remains unchanged at the end of operations i.e., $V = \mathbb{I}$. From here on, with a slight abuse of notation when it is written $U \in J_n^a$, it is assumed it is the unitary that acts on the joint state space of input and ancilla qubits.

If $U \in J_n^a$, implying its entries are in the ring $\mathbb{Z}[i, 1/\sqrt{2}]$, then from Equation 8 the entries of $\hat{U}$ are in the same ring. Since $\hat{U}$ is real, its entries are from the subring:

$$\mathbb{Z}\left[\frac{1}{\sqrt{2}}\right] = \left\{\frac{a + b\sqrt{2}}{\sqrt{2}^k} : a, b \in \mathbb{Z}, k \in \mathbb{N}\right\}$$

The channel representation identifies unitaries which differ by a global phase. The following notation is used for the group of channel representations (where redundant global phases do not appear):

$$\hat{\mathcal{J}_n^a} = \{\hat{U} : U \in \mathcal{J}_n^a\}, \hat{\mathcal{C}_n} = \{\hat{C} : C \in \mathcal{C}_n\}$$

A matrix W belongs to the latter set if and only if it is a unitary matrix with one nonzero entry in each row and each column, equal to $\pm 1$. This is because Cliffords map Paulis to Paulis up to a possible phase factor of $-1$.

Since the definition of T-count is insensitive to global phase, it is well-defined in the channel representation: for $U \in J_n^a$ define $T(\hat{U}) = T(U)$.

2.4. Decomposition of Unitaries in $J_n^a$

In [GKMR13] the authors proved a result about the decomposition of unitaries in $J_n$. The same conclusion about unitaries which require ancillas (by considering the unitary that acts on the joint state space) can be deduced.

Theorem 2.2. (Proposition 1 in [GKMR12] (re-stated)). For any $U \in J_n^a$ there exists a phase $\phi \in [0, 2\pi)$, a Clifford C0 $\in$ Cn and non-identity n-qubits Paulis Pi for $i \in [T(U)]$ such that:

$$U = e^{i\phi}\left(\prod_{i=T(U)}^{1} R(P_i)\right)C_0 \quad (9)$$

where:

$$R(P) = \frac{1}{2}(1 + e^{\frac{i\pi}{4}})\mathbb{I} + \frac{1}{2}(1 - e^{\frac{i\pi}{4}})P.$$

It is possible to also write:

$$R(P) = \frac{1}{2}\left(1 + e^{\frac{i\pi}{4}}\right)\mathbb{I} + \frac{1}{2}\left(1 - e^{\frac{i\pi}{4}}\right)C_i Z_{(q_i)} C_i^\dagger = C_i T_{(q_i)} C_i^\dagger.$$

Using Fact 2.1 each of these R(P) can be synthesized very efficiently.

Fact 2.2. The channel representation inherits the decomposition from Theorem 2.2 and in this representation, there is no global phase factor.

$$\hat{U} = \left(\prod_{i=T(U)}^{1} \hat{R(P_i)}\right)\hat{C_0}. \quad (10)$$

Computing T-Optimal Circuits

A simple application of the decomposition in Theorem 2.2 is the following result shown in [GKMR13]:

Suppose A is an algorithm which solves the decision problem COUNT-T. For any $U \in J_n^a$, with overhead polynomial in N and T(U), such an algorithm can also be used to generate a T-optimal circuit for U over the gate set $\{H, T, CNOT\}$.

T-Count for Single Qubit Unitaries

For single qubit unitaries $U \in J_1^a$ it has been shown in [GKMR13] that the T-count can be directly computed from its channel representation $\hat{U}$. For this the authors introduced the following quantity and proved the following results.

Definition 2.1. For any non-zero $v \in \mathbb{Z}[1/\sqrt{2}]$ the smallest denominator exponent, denoted by sde(v), is the smallest $k \in \mathbb{N}$ for which:

$$v = \frac{a + b\sqrt{2}}{\sqrt{2}^k} \quad \text{with } a, b \in \mathbb{Z}.$$

Define sde (0)=0. By the above definition a is odd when k>0.

For a d1×d2 matrix M with entries over this ring it is defined by:

$$sde(M) = \max_{c \in [d_1], b \in [d_3]} sde(M_{ab}).$$

Fact 2.3. (Fact 2 in [GKMR13]). Let q, $r \in \mathbb{Z}[1/\sqrt{2}]$ with sde(q)>sde(r). Then $$sde\left(\frac{1}{\sqrt{2}}(q \pm r)\right) = sde(q) + 1.$$

Fact 2.4. Let q, r∈ℤ [1/√2] with sde(q)=sde(r). Then $$sde\left(\frac{1}{\sqrt{2}}(q \pm r)\right) \leq sde(q).$$

Theorem 2.3. (Theorem 1 in [GKMR13]). The T-count of a single qubit unitary in $J_1^a$ is equal to the sde of its channel representation, i.e., sde (Û).

But the above characterization does not generalize to n>1 qubits. As a counterexample the sde of the channel representation of the Toffoli gate is 2 but its T-count is 7.

3. Properties of Channel Representation of R(P)

In this section some observations about the structure of the channel representation of R(P) where P∈$P_n$ are made. Since the channel representation of nxn identity is $n^2 \times n^2$ identity, the focus is on the non-identity Paulis. This leads to more compact representation (and hence less storage space) and efficient computation of these unitaries. It also gives much faster algorithms for certain operations like multiplication by these unitaries (or their inverses). This reduces the overhead (space and time complexity) in algorithms involving these operations.

Let Û is indexed by Paulis $P_r$, $P_s$ ∈$P_n$ in its rows and columns and both the first row and column has index $\mathbb{I}^{\otimes n}$.

Claim 3.1. The first row and column has all 0, except the first entry, which is 1.
Diagonal Elements of Û
claim 3.2. The diagonal entries of Û are 1 or 1/√2.
Off-Diagonal Elements of Û
claim 3.3. If Û [i,i]=1/√2 for some non-zero i then there exists exactly one non-zero j, k, both of which are not equal to i, such that Û [i,j]=∓1/√2 while Û [k,i]=∓1/√2.

Furthermore, it can also be proved that if a diagonal entry is 1 then all other entries in the corresponding row and column is 0.

Claim 3.5. Exactly $2^{2n-1}$ diagonal elements can be 1/√2.

3.1. A Compact Representation of Channel Representation of R(P)

From the above discussions it can be deduced that it is sufficient to represent the $N^2 \times N^2$ matrix for the channel representation of R(P) as an array of length $N^2/4$ i.e., $2^{2n-2}$.

Let R(P)=U for some non-identity n-qubit Pauli P. Assume in row i there is Û [i,i]=1/√2 and Û [i,I]=±1/√2. By claim 3.4 it can be said that Û [I,I]=1/√2 and Û [I,i]=−Û [i,I]. All other entries in these two rows are 0.

So, it is possible to store all the necessary information in an array $A_Û$ where each entry of this array is a pair of the form (i, +I) (i<I) which signifies that Û [i,i]=1/√2 and Û [i,I]=±1/√2. There may not be a need to store (I, ∓i). And for values k where U[k,k]=1, none of the stored pairs of integers will contain tk. This array is of size $N^2/4$.

3.2. Multiplication of Channel Representation of R(P) with any Matrix

Let U=R(P) where P is a non-identity n-qubit Pauli. In it desirable to analyze the multiplication of Û with some matrix V of dimension $N^2 \times N^2$. Let W=ÛV:

$$W_{ij} = \sum_{k=1}^{N^2} \hat{U}_{ik} V_{kj}. \tag{15}$$

Consider the following cases.

Case I: Diagonal Element of the Channel Representation of R(P) is 1.

Let Û [i,i]=1. Then it is known from claim 3.4 that Û [i,k]=0 for all k≠i. So, W[i]=V[i,j] ∀j∈[$N^2$]. Thus W[i,.]=V [i,.], in other words, the $i^{th}$ row of V gets copied into the $i^{th}$ row of the product matrix W.

Case II: Diagonal Element of Channel Representation of R(P) is 1/√2

Let Û [i,i]=1/√2. Then it is known from claim 3.4 that there exists I≠i such that Û [i,I]=+1/√2 and Û [I,i]=∓1/√2. Also, Û [i,i]=1/√2. Thus:

$$W_{ij} = \hat{U}_{ii}V_{ij} + \hat{U}_{iI}V_{Ij} = \frac{1}{\sqrt{2}}(V_{ij} \pm V_{Ij}) \quad \forall j \in [N^2]$$

Similarly, $$W_{ij} = \hat{U}_{II}V_{Ij} + \hat{U}_{Ii}V_{ij} = \frac{1}{\sqrt{2}}(V_{Ij} \mp V_{ij}) \quad \forall j \in [N^2]$$

Thus, the $i^{th}$ and $I^{th}$ row of W becomes a linear combination of the $i^{th}$ and $I^{th}$ rows of V To summarize, using the compact representation ($A_Û$) of Û where U=R(P) it is possible to construct the product W using the following algorithm (MULT):

1. For every $j = 1, \ldots, N^2/4$ do the following:

(a) Let $(i, \pm \ell) \leftarrow A_{\hat{U}}[j]$.

(b) $W[i, .] \leftarrow \frac{1}{\sqrt{2}}[V[i, .] \pm V[\ell, .]]$.

(c) $W[\ell, .] \leftarrow \frac{1}{\sqrt{2}}[V[\ell, .] \mp V[i, .]]$.

(d) $S \leftarrow S \cup \{i, \ell\}$. (S is a set to store the indices of non-unity diagonal elements.)

2. For every $k \in [N^2] \setminus S$ (a) $W[k, .] \leftarrow V[k, .]$.

This provides reduced space and time complexity for the computation of channel representation of any unitary in $J_n^a$, provided its decomposition into product of R(P) is known.

Inverse of Channel Representation of R(P)

A compact representation of the inverse of the channel representation of R(P) can be determined as follows. Consider the array which gives a compact representation of the channel representation of R(P). Just flip the sign in the second entry of each pair in this array. The inverse of the matrix is determined.

Complexity of the Multiplication Algorithm MULT

Let W=ÛV and U=R(P), where P is a non-identity n-qubit Pauli. Note the unitaries are of dimension $N^2 \times N^2$. From the above algorithm half of the rows of V get copied to W. For the remaining $N^2/2$ rows component-wise addition or subtraction and multiplication among pairs of rows of V is performed. Thus, following result is derived:

Theorem 3.1. W can be computed in time $O(N^4/2)$.

Currently the fastest algorithm for matrix multiplication has a time complexity $O(N^{4.7457278})$ [LG14] for multiplying two $N^2 \times N^2$ matrices. So, the algorithm MULT can be very useful as the dimension $N=2^n$ increases or in situations where many such multiplications are required.

3.3. A Data Structure for the Channel Representation

It may be possible to implement a data structure that will avoid working with floating point arithmetic. This became especially useful while implementing the heuristic algorithm given in Section 5, where it is crucial to keep track of the sde of a unitary matrix.

It is known that the entries of U are in the ring $\mathbb{Z}[1/\sqrt{2}]$. Thus, if $v=\hat{U}[i,j]$ then it can be written as $$v = \frac{a+b\sqrt{2}}{\sqrt{2}^k}, \text{ where } a, b \in \mathbb{Z} \text{ and } k \in \mathbb{N}.$$

It is possible to ensure that k is the sde of v. Thus every time v gets modified the necessary reductions are made. If a is odd or k=0 it cannot be reduced any further.

Sde of Product Matrix

Further observations about the sde of the product matrix while multiplying by channel representation of R(P) where P is a non-identity n-qubit Pauli are described. This again becomes useful for the heuristic algorithm in Section 5.

Let W=UV where U=R(P). From Fact 2.3 and 2.4 it can be deduced that sde of each entry of W increases by 1 or remains same or decreases by 1. Thus, the following result occurs:

Fact 3.2. sde(W)=sde(V)+1 or sde(W)=sde(V).

4. A Space-Efficient Provable Algorithm for COUNT-T

In this section, example embodiments where the meet-in-the-middle algorithm in [GKMR13] is modified and extended, which may achieve a provable algorithm for COUNT-T (decision) that can be implemented with much less space while retaining the overall space x time complexity. The space complexity of the described algorithm is $O(N^{2\lceil m/c \rceil} \text{poly}(m,N))$ while the time complexity is $O(N^{2\lceil m/c \rceil} \text{poly}(m,N))$ ($c \geq 2$). This kind of algorithm becomes especially useful if it is desired to store the database and run the algorithm several times to test the T-count of a number of unitaries.

To decide if $T(U) \leq m$ where $U \in J_n^a$, it may be deduced that any such unitary has a decomposition given by Theorem 2.2. Utilizing this result, it is possible to search over expressions of the form $U^\dagger \Pi_{i=m}^{'} R(P_i)$ until one that is a global phase times an element of the Clifford group $C_n$ is found.

Figure 3:
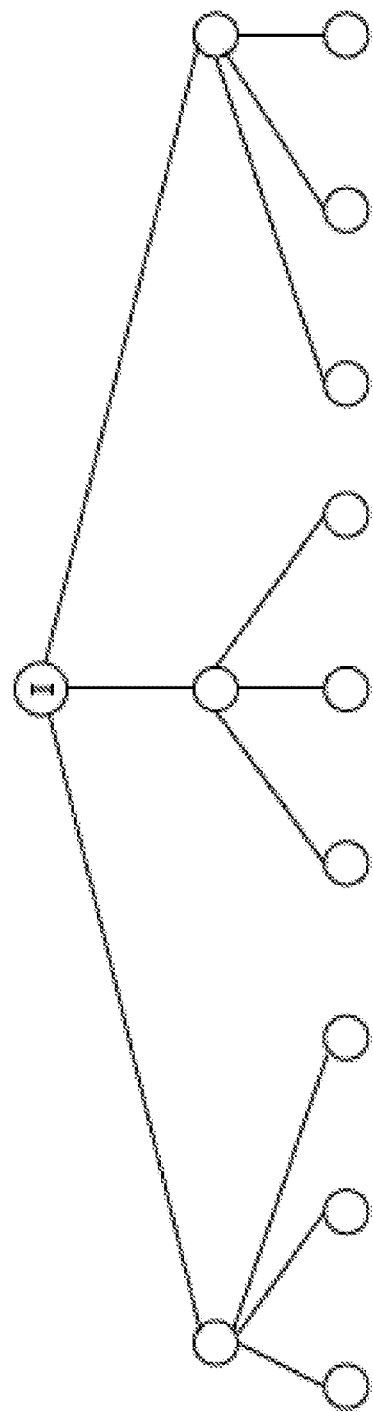
FIG. 3 illustrates a tree structure.

It might be useful to compare this procedure with building a tree, whose nodes store some unitary and the edges represent some R(P). Thus, the unitary in a child node is obtained by multiplying the unitary of the parent node with the R(P) represented by the edge. Thus, there can be at most $N^2-1$ children nodes of any parent node, since $|P_n \setminus \{\mathbb{I}\}|=N^2-1$. The root in this case stores I and it is assumed it is at depth 0 (FIG. 3). As shown in FIG. 3, part of the procedure of the provable algorithm can be compared to building a tree up to a certain depth. The root of the tree stores $\mathbb{I}$.

In example embodiments, in an exhaustive search the tree might have to be built until depth m and then a search for a unitary V in this tree such that $U^\dagger V$ is a global phase times an element of $C_n$ is performed. This gives a search space of size at most $N^{2m}$. To reduce the search space and hence time, a slightly more complicated procedure may be used. Very concisely, this tree may be built till depth $\lceil m/c \rceil$, where $c \geq 2$. If some appropriate unitary within this depth is not found, then with the help of the unitaries in the leaves a recursive search in the remaining tree is performed. In the meet-in-the-middle search algorithm of [GKMR13] c=2. This disclosure, in example embodiments, modifies this and take c>2. Hereinafter, this is denoted as the "nested meet-in-the-middle algorithm" because of the recursive application of meet-in-the-middle method.

Some necessary definitions and results from [GKMR13] that will be useful in describing the proposed algorithm are set out below. The following notion determines whether two unitaries are from the same coset.

---

Definition 4.1 ((Coset label). Let $W \in \widehat{\mathcal{J}_n^a}$. Its coset label $W^{(co)}$ is the matrix obtained by the following proedure. (1) Rewrite W so that each nonzero entry has a common denominator, equal to $\sqrt{2}^{sde(W)}$. (2) For each column of W, look at the first non-zero entry (from top to bottom) which we write as $v = \frac{a+b\sqrt{2}}{\sqrt{2}^{k(W)}}$. If $a < 0$, or if $a = 0$ and $b < 0$, multiply every element of the column by −1. Otherwise, if $a > 0$, or $a = 0$ and $b > 0$, do nothing and move on to the next column. (3) After perfoming this step on all columns, permute the columns so they are ordered lexicographically from left to right.

---

Theorem 4.1. (Proposition 2 in [GKMR13] (re-stated)). Unitaries W, V have the same coset label if and only if W=VC for some C which is the channel representation of some n-qubit Clifford.

Using the coset labels a sorted coset database can be constructed as follows.

Definition 4.2. (Sorted coset database $D_k^n$). For any positive integer k, a sorted coset database $D_k^n$ is a list if channel representation of unitaries in $J_n^a$ with the following properties:

1. Every unitary in the database has T-count k.
2. For any unitary with T-count k, there is a unique unitary in the database with the same coset label.
3. The database is sorted according to the coset labels.

4.1. Nested meet-in-the-middle algorithm

A sorted coset database with T-count at most $c'=\lceil m/c \rceil$, where c>2 is built. If the coset label of the given unitary U is not found within this database, it implies its T-count is greater than c'. Then whether the T-count is at most 2c' is checked by a meet-in-the-middle search, using the database with T-count c'. If a match is not found at this step, then using the very same database a "sort of" meet-in-the-middle search is performed to check if the T-count is at most 3c'. These iterations are repeated till T-count at most m is tested. If the search has been unsuccessful in all the previous steps, then it can be concluded that T-count of the given unitary U is greater than m.

A more detailed description of the algorithm is given below:

---

Input: (i) A unitary $U \in \mathcal{J}_n^c$ and (ii) a non-negative integer m.
Output: $\mathcal{T}(U)$ if it Is less than m or return NO.
0. We calculate the channel representation $\hat{U}$ and its coset label $\hat{U}^{(co)}$.

1. Precompute sorted coset databases $\mathcal{D}_0^n, \mathcal{D}_1^n, \ldots, \mathcal{D}_{\lceil \frac{m}{c} \rceil}^n$, for some positive integer $c > 2$.

We start with $\mathcal{D}_0^n$ which contains only the $N^2 \times N^2$ identity matrix. Then $\mathcal{D}_0^n, \mathcal{D}_1^n, \ldots, \mathcal{D}_{\lceil \frac{m}{c} \rceil}^n$ are constructed recursively as follows. To construct $\mathcal{D}_k^n$ we consider all unitaries of the form
$$W = R(P)M \qquad (16)$$
3. Nested meet-in-the-middle.
Set $j = 1$.

While $j \lceil \frac{m}{c} \rceil < m$ do the following:

(a) Let $B = \min\{(j+1)\lceil \frac{m}{c} \rceil, m\}$.

(b) Check if $j \lceil \frac{m}{c} \rceil < \mathcal{T}(U) \leq B$.

Let $r = B - j\lceil \frac{m}{c} \rceil$. For each $W \in \mathcal{D}_r^n$ we calculate $V = W^\dagger \hat{U}$. We recurse through the steps done before to check if $\mathcal{T}(V) \leq j \lceil \frac{m}{c} \rceil$. If it returns i then we OUTPUT $\mathcal{T}(\hat{U}) = \mathcal{T}(V) + r$ and STOP. Else, we set $j \leftarrow j + 1$ and REPEAT the while loop.
4. OUTPUT NO implying $\mathcal{T}(U) > m$.

---

Complexity

The time and space complexity of the above algorithm is calculated assuming the RAM model. To compute the sorted coset database, the algorithm loops over all unitaries in Equation 16, with $k \in \{0, 1, \ldots, \lceil m/c \rceil\}$. There are $O(N^{2\lceil m/c \rceil})$ such unitaries. For each unitary the coset label is computed and searched to find it in database generated so far. This takes time $O(\log(N^{2\lceil m/c \rceil}))$ since the database is sorted. The unitaries and their coset labels are of size $N^2 \times N^2$. So, step 1 takes time $O(N^{2\lceil m/c \rceil} \text{poly}(m,N))$. To store the database similarly requires space $O(N^{2\lceil m/c \rceil} \text{poly}(m,N))$. Step 2 takes time $O(\text{poly}(m, N))$ for binary search through the sorted database.

Now consider the complexity of the while loop in step 3. Consider the first iteration. Let $t = \lceil m/c \rceil$. There are $O(N^{2\lceil m/c \rceil})$ unitaries in the last coset database stored and so $O(N^{2\lceil m/c \rceil})$ number of V are calculated serially in step 3b. For each such V, to check if T(V) is at most t requires time $O(\text{poly}(m,N))$. Thus, the first iteration of while loop takes time $O(N^{2\lceil m/c \rceil} \text{poly}(m,N))$. Assume that the time taken to complete $(j-1)^{th}$ iteration is in $O(N^{2\lceil m/c \rceil} \text{poly}(m,N))$. Now consider the $j^{th}$ iteration. Again, computing at most $O(N^{2\lceil m/c \rceil})$ unitaries V at step 3b. For each V, to test if their T-count is at most it takes time $O(N^{2(j-1)\lceil m/c \rceil} \text{poly}(m,N))$. So total time taken to complete the $j^{th}$ iteration is $O(N^{2j\lceil m/c \rceil} \text{poly}(m,N))$.

Thus, by induction it can be concluded that the total time taken at step 3 is at most $O(N^{2(c-1)\lceil m/c \rceil} \text{poly}(m,N))$. Hence the time complexity of the given algorithm is $O(N^{2(c-1)\lceil m/c \rceil} \text{poly}(m,N))$ and space complexity is $O(N^{2\lceil m/c \rceil} \text{poly}(m,N))$.

Correctness

The algorithm correctly generates the sorted coset databases. The proof is similar to the one given in [GKMR13] (Section 5.2) and it is skipped it here. Given this fact it follows that if $0 \leq T(U) \leq \lceil m/c \rceil$ then step 2 of the disclosed algorithm will correctly compute T(U).

It is also possible to prove that if $\lceil m/c \rceil \leq T(U) \leq m$ then the disclosed algorithm correctly computes it at step 3. It is sufficient to show that this property holds for any particular iteration of the while loop. That is, if $j\lceil m/c \rceil \leq T(U) \leq \min\{(j+1)\lceil m/c \rceil, m\}$ then the algorithm correctly returns it in the $j^{th}$ iteration. This proof is similar to Theorem 2 in [GKMR13].

---

Theorem 4.3. Let $m \in \mathbb{N}, c \geq 2$ and $j \geq 1$ are integers. $U \in \mathcal{J}_n^a$ is a unitary with $j\lceil \frac{m}{c} \rceil < \mathcal{T}(U) \leq B$, where $B = \min\{(j+1)\lceil \frac{m}{c} \rceil, m\}$. Let $\mathcal{D}_0^n, \mathcal{D}_1^n, \ldots, \mathcal{D}_{\lceil \frac{m}{c} \rceil}^n$ are sorted coset databases.

Then $t = \mathcal{T}(U)$ is the smallest integer in $\{j\lceil \frac{m}{c} \rceil + 1, j\lceil \frac{m}{c} \rceil + 2, \ldots, B\}$ for which
$$(W^\dagger \hat{U}) = V \qquad (17)$$
for some W with $W^{(co)} \in \mathcal{D}_r^n$, where $r = B - j\lceil \frac{m}{c} \rceil$, and V is a unitary such that $\mathcal{T}(V) \leq j\lceil \frac{m}{c} \rceil$, and $t = r + \mathcal{T}(V)$.

---

If none of the iterations of the while loop in step 3 return T(U) then it implies T(U)>m and the algorithm returns NO.

This completes the proof of correctness of the proposed algorithm.

5. A polynomial time and space heuristic algorithm

In this section the application describes a heuristic polynomial time and space algorithm for COUNT-T. In the provable algorithm described in Section 4 a nested meet-in-the-middle technique was used to search for a set of channel representation of R(P) such that:

$$\hat{U}^\dagger \prod_{i=\mathcal{T}(U)}^{1} \widehat{R(P_i)} \text{ is } \widehat{C_0} \text{ for some } C_0 \in \mathcal{C}_n$$

Alternatively, searching for a set of inverses of channel representation of R(P) can be implemented, such that:

$$\left(\prod_{i=1}^{m} \widehat{R(P_i)}^{-1}\right) \hat{U} \text{ is } \widehat{C_0}$$

for some Clifford $C_0$, which is the approach taken by the disclosed heuristic algorithm.

Figure 4:
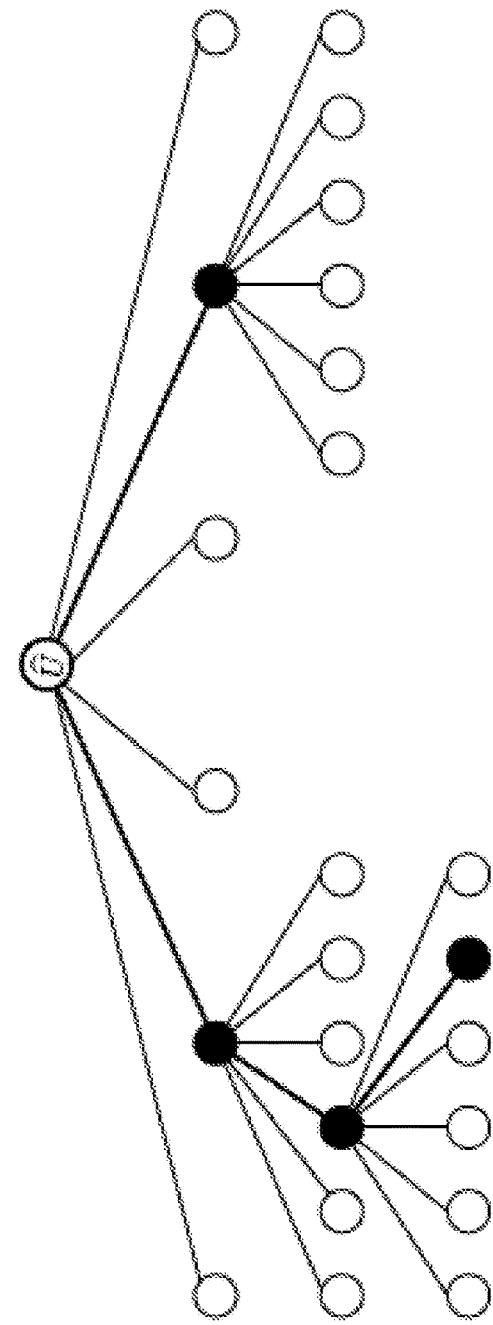
FIG. 4 illustrates a tree built via a heuristic procedure.

As in Section 4 a tree is built but instead $\hat{U}$ is stored in the root. This time the edges represent inverse of the channel representation of R(P) for some non-identity n-qubit Pauli. Building this tree is stopped the moment a node which stores the channel representation of some n-qubit Clifford is reached. This implies that the path from the root to this leaf gives a decomposition of $\hat{U}$. In these kinds of searches the size of the tree is one of the important factors that determine the complexity of the algorithm. To reduce the complexity, various methods of pruning the tree are described herein, an example of which is shown in FIG. 4.

In example embodiments, at each level the nodes are grouped according to some "properties", or "parameters" (also referred to as "multiplicity criteria") of the unitaries stored in them. These parameters will "distinguish" the "correct" nodes at each level or depth of the tree and thus aid in arriving at a decomposition. Note there can be more than one decomposition of $\hat{U}$ with the same or different T-count. "Correct" nodes in this instance denote those nodes that occur in a minimal decomposition (with minimum number of T gates) of $\hat{U}$. If the parameters always select only the correct nodes, then it is expected to get much fewer nodes at each level of the tree and that the number of levels needed to be built is T(U). In example embodiments, the parameters selected did not always distinguish the correct nodes and there were some false positives. In some embodiments, for the algorithm to succeed further adjustments may be implemented so as not to lose all correct nodes at any level and to make the algorithm is efficient. The further adjustments may ensure that the number of false positives are not too large, and they eventually get eliminated.

In example embodiments, two parameters-sde and Hamming weight of the unitaries were used to evaluate groups of nodes. Fact 3.2 provides that sde of a child node unitary can differ by at most 1 from its parent node unitary. While building a unitary it is proposed to start with channel representation of $\mathbb{I}_n$ and multiply by subsequent channel representation of $R(P_i)$ till $\hat{U}$ is reached. It has been observed that in most of these multiplications the sde increases by 1 and the Hamming weight also gradually increases until it (Hamming weight) reaches the maximum. So, while doing the inverse operations i.e., decomposing $\hat{U}$ it may be expected that in most of the steps sde will decrease by 1 and the closer to an identity, the Hamming weight will also likely decrease. If the algorithm multiplies by a "wrong" matrix it may be expected to see the same changes with much less probability, which is the probability of the false positives. This helps distinguish between the "correct" and "wrong" nodes.

Specifically, at each level the set S of nodes is divided into some subsets and selected one of them. Below are shown three example embodiments:

A. The nodes are divided into two sets—$S_0$ (sde increase) and $S_1$ (sde decrease). The set with the minimum cardinality is selected. In example embodiments, the nodes with unchanged sde are also selected.

B. The nodes are divided into 4 sets—$S_{00}$ (both sde and Hamming weight increase), $S_{01}$ (sde increase, Hamming weight decrease), $S_{10}$ (sde decrease, Hamming weight increase) and $S_{11}$ (both sde and Hamming weight decrease). Nodes with unchanged Hamming weight but sde increase are put in both $S_{00}$ and $S_{01}$, while nodes with unchanged Hamming weight but sde decrease are put in both $S_{10}$ and $S_{11}$. The set with the minimum cardinality is selected, and the selected set can include in it the nodes with unchanged sde (irrespective of the change in Hamming weight).

C. The nodes are divided into 9 sets—$S_{00}$ (both sde and Hamming weight increase), $S_{01}$ (sde increase but Hamming weight decrease), $S_{02}$ (sde increase but Hamming weight same), $S_{10}$ (sde decrease, Hamming weight increase) and $S_{11}$ (both sde and Hamming weight decrease), $S_{12}$ (sde decrease but Hamming weight same), $S_{20}$ (sde same but Hamming weight increase), $S_{21}$ (sde same but Hamming weight decrease), $S_{22}$ (both sde and Hamming weight same). The set with the minimum cardinality is selected.

Any one of the above methods of divide-and-select can be used throughout the algorithm. In example embodiments, different groupings are used. Now at each level more than one node from different parents can store the same unitary. So, the same unitary may be counted more than once. Thus, in some example embodiments, while solving COUNT-T (decision) with this approach, the algorithm sometimes returns a longer path (or decomposition). To force the algorithm to always go along the shortest path, in example embodiments further restrictions are enforced. Based on the fact that sde can change by at most 1 and in the decision version of COUNT-T, and with the known maximum depth of the tree that needs to be built, in example embodiments:

At each level the set with the minimum cardinality is selected such that the sde of the unitaries in this set can decrease to 0 within the remaining (yet to be built) levels. Also, nodes with unchanged sde are included only if this sde can decrease to 0 within the rest of the levels.

If no such unitary exists it is concluded that T-count is more than the input (test T-count) given. FIG. 4 shows the tree built in the heuristic procedure. At each level a set of nodes according is selected to some changes in the properties of the child unitaries with respect to their parents, for example change in sde and Hamming weight. Unitaries in the next level are generated from the selected set (black nodes). The tree building is stopped as soon as a unitary with sde 0 is reached. The path length to this node (in this case 3) is the T-count of the unitary U. It also gives the optimal decomposition of U.

The algorithm for COUNT-T (optimization) is as follows:

Input : $\hat{U}$ such that $U \in \mathcal{J}_n^a$.
Output : $[P_{t(U)}, P_{t(U)-1}, \ldots, P1, \widehat{C_0}]$ such that
$\hat{U} = (\prod_{i=\mathcal{T}(U)}^{1} \widehat{R(P_i)}) \widehat{C_0}$ where $C_0 \in \mathcal{C}_n$.
1. m = sde(U),
2. While(1)
  (a) Call COUNT-T (decision) with input ($\hat{U}$, m).
  (b) If returns a decomposition:
    Return the decomposition:
    Break
  (c) Else m ← m + 1.

A description of COUNT-T (decision) is as follows.

Input : (i) $\hat{U}$ such that $U \in \mathcal{J}_n^a$ and (ii) a non-negative integer m.
Output : If a decomposition exisit then $[P_{m'}, P_{m'-1}, \ldots, 1, \widehat{C_0}]$ such that m' ≤ m and
$\hat{U} = (\Pi_{i=m'}^{1} \widehat{R(P_i)}) \widehat{C_0}$ where $C_0 \in \mathcal{C}_n$, else NO.
1. Path ← []; $\tilde{U}$ ← {($\hat{U}$, Path)}.

/* Path is an array that stores the path (or sequence of $\widehat{R(P)}^{-1}$ ) to the current node. */
2. For i = 1, 2, . . . , m do the following:

(a) Multiply each unitary in $\tilde{U}$ by $\widehat{R(P)}^{-1}$, for Pi $\in \mathcal{P}_n \setminus \{\mathbb{I}\}$.
   (b) Note the changes in sde and Hamming weight. If sde of any product unitary 0 then
      STOP and return the Path till this node and the unitary itself($\widehat{C_0}$).
   (c) Else, apply a divide-and-select method (A, B or C, which should be followed throughout
      the algorithm) described before. Note (by the above discussion) the selected set $S_{min}$
      (say) has unitaries with sde at most m – i. If no such set is found then STOP and return
      NO.
      /* sde > m – i implies we cannot decrease it to 0 within the next m – i iterations.*/
   (d) Empty $\tilde{U}$ and include the product unitaries in $S_{min}$ along with their Path.

Space and Time Complexity

The analysis of space and time complexity of the algorithm COUNT-T is based on the following assumptions.
Conjecture 1.
  A. The cardinality of the set $\tilde{U}$ in each iteration of COUNT-T is at most poly (N), when method A of divide-and-select is applied.
  B. The cardinality of the set $\tilde{U}$ in each iteration of COUNT-T is at most poly (N), when method B of divide-and-select is applied.
  C. The cardinality of the set $\tilde{U}$ in each iteration of COUNT-T is at most poly (N), when method C of divide-and-select is applied.

In the experiments (where the method C of divide-and-select is applied) this number is constant in most of the iterations.

Consider the algorithm COUNT-T (decision). There are $N^2-1$ multiplications in each iteration for each unitary in U. And by the above conjecture $|\tilde{U}|$ is in poly (N). Thus, both the time and space complexity of COUNT-T (decision) are in poly (N, m).

COUNT-T (decision) is called at most T(U) times to solve COUNT-T (optimization). Thus, space and time complexity of COUNT-T (optimization) are in poly (N, T(U)).

5.1. Implementations and Results

The heuristic algorithm COUNT-T (optimization) was implemented in Python on a machine with Intel (R) Core™ i-7700K CPU at 4.2 GHz, having 8 cores and 16 GB RAM and running Linux Debian 9.12. It was observed that in the first level of the tree for certain iterations of COUNT-T (decision) the sde of all the nodes increases for all the untiaries tested. During the example embodiment implemented, the first two iterations were joined i.e., the set of nodes with minimum cardinality (with necessary restrictions) in level 2 of the tree (considering root is at level 0) were selected. Subsequently, the rest of the iterations were performed successively, as described. This improved the running time. It is also noted that part of the circuit (except the Clifford $C_0$) from the output of COUNT-T (optimization) using Fact 2.1 (Section 2.4) can be synthesized. The algorithm in [AG04] to synthesize $C_0$. This procedure is very efficient. The main bottleneck is to get the decomposition.

Some known 3 and 4 qubit gates like Toffoli, Fredkin and Peres and also a 4-qubit 1-bit reversible adder circuit were tested. It was found the T-count for all these gates is 7. This agrees with the results in [AMMR13, GKMR13, DMM16] but the proposed algorithm is much more efficient. For example, the largest circuit that could be synthesized with the parallel algorithm in [DMM16] was the 4-qubit 1-bit reversible adder and it took 12.5 hours using 4096 cores (processors). In comparison the COUNT-T (optimization) takes about 7 min 9 sec to get a decomposition using 8 cores. It takes an additional few seconds to synthesize a circuit for this part.

Also tested were some 4-qubit circuits like $U_1=(TOF \otimes \mathbb{I})(\mathbb{I} \otimes TOF)$ [AMMR13] and $U_2=(TOF \otimes \mathbb{I})(\mathbb{I} \otimes TOF)(TOF \otimes \mathbb{I})$, where TOF is the 3-qubit Toffoli gate. A T-count of 11 and 7 respectively were obtained instead of 14 [AMMR13] and 21, had an optimized circuit for Toffoli been used. A comparison of performance of the proposed algorithm (serial) with the parallel algorithm in [DMM16] has been given in Table 1. (It should be noted that the running time of the proposed algorithm does not include the synthesis of $C_0$, but this part is usually more efficient.)

Figure 5:
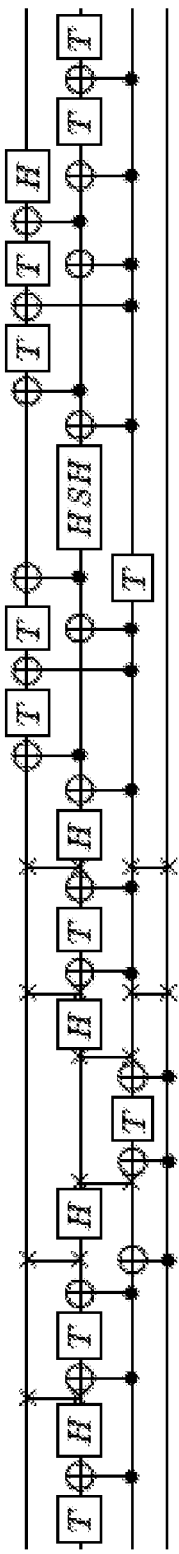
FIG. 5 illustrates an example of a partial circuit of U1.
Figure 6:
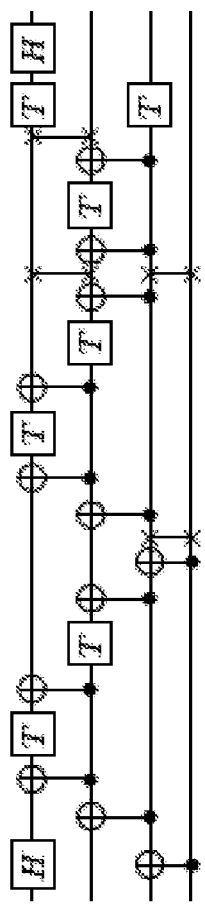
FIG. 6 illustrates an example of a partial circuit of U2.

A partial circuit (from the first T to last T gate) of U1 and U2 is shown in FIGS. 5 and 6, respectively. In the figures the connected X gates indicate swaps which can be implemented by CNOT gates.

TABLE 1

Comparison of running time of the proposed algorithm (serial) with the parallel algorithm in [DMM16]. Time given in hours (hr), minutes (min) and seconds(s)

| Unitary | # qubits | T-count | Time of [DMM16] | # cores used in [DMM16] | Time of our algo | # cores we used |
|---|---|---|---|---|---|---|
| Toffoli | 3 | 7 | 25.9870 s | 4096 | 5.75 s | 8 |
| Fredkin | 3 | 7 | 25.0031 s | 4096 | 5.9 s | 8 |
| Peres | 3 | 7 | 25.4931 s | 4096 | 5.74 s | 8 |
| 1-bit full adder | 4 | 7 | 12.5 hr | 4096 | 429.17 s | 8 |
| $U_1$ | 4 | 11 | N/A | N/A | 2.17 hr | 8 |
| $U_2$ | 4 | 7 | N/A | N/A | 391.269 s | 8 |

FIG. 5 shows a partial circuit of U1 over the Clifford+T gate set. The circuit has been drawn from the first T to last T gate. The path obtained for U1 was:

[$\mathbb{III}Y\mathbb{I}$, $\mathbb{I}ZY\mathbb{I}$, $\mathbb{III}YX$, $\mathbb{I}ZYX$, $\mathbb{III}XX$,
$\mathbb{I}Z\mathbb{III}$, $\mathbb{I}ZXX$, $Z\mathbb{III}X$, $Z\mathbb{I}X\mathbb{I}$, $ZZ\mathbb{I}X$, $ZZX\mathbb{I}$, $\widehat{C_0}$]

for some $C_0 \in C_n$.

FIG. 6 shows a partial circuit of U2 over the Clifford+T gate set. The circuit has been drawn from the first T to last T gate. The path obtained for $U_2$ was:

IIIX, IZII, IZIX, ZIZI, ZIZX, ZZZI, ZZZX, $\widehat{C_0}$ ]
for some $C_0 \in C_n$.

Figure 11A:
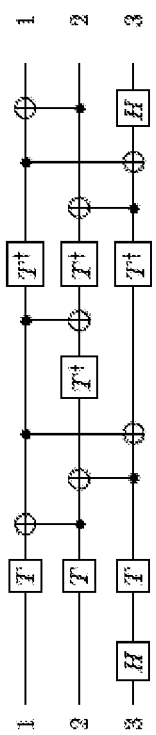
FIGS. 11A to 11C illustrate example resynthesized quantum circuits according to example algorithms.
Figure 11B:
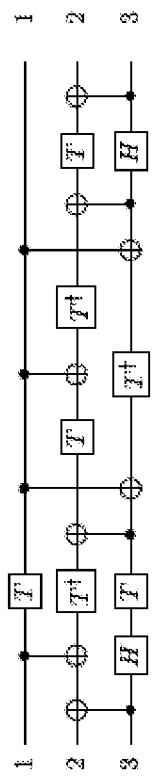
Figure 11C:
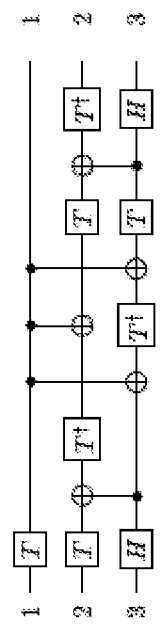
Figure 12:
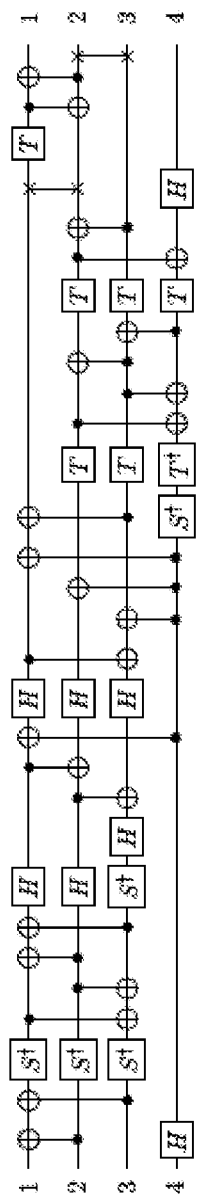
FIG. 12 illustrates an example decomposition of a circuit according to example algorithms.

FIGS. 11A to 11C show example decompositions of example known gates (FIG. 11A shows a Toffoli gate, FIG. 11B shows a Fredkin date, and FIG. 11C shows a Peres gate decomposition) based on example embodiments of the heuristic algorithm described herein.

FIG. 12 shows an example decomposition of 4-qubit adder over the Cliffoft+Tgate set, based on example embodiments of the heuristic algorithm described herein.

6. Conclusion (T-Count)

Modifying the meet-in-the-middle algorithm of [GKMR13] in accordance with the described process via the described provable nested meet-in-the-middle algorithm for COUNT-T (decision), may have better space complexity but worse time complexity. However, both the time and space complexity are exponential in N and m.

The described heuristic algorithm for COUNT-T (optimization) has space and time complexity polynomial in N and m, thus (partly) answering a question left open in [GKMR13]. Testing of the (serial) algorithm on some 3 and 4 qubit circuits produced optimal T-count with much less running time compared to previous algorithms like the parallel one in [DMM16].

T-Depth Optimization

Definition 7.2. The depth of a circuit is the length of any critical path through the circuit. Representing a circuit as a directed acyclic graph with nodes corresponding to the circuit's gates and edges corresponding to gate inputs/outputs, a critical path is a path of maximum length flowing from an input of the circuit to an output.

The problem of quantum circuit synthesis refers to finding some circuit containing only gates taken from a fixed set performing the desired unitary. This fixed set is called an instruction set herein and is required to contain the inverse of each gate in the set. An n-qubit circuit over instruction set G is then the composition of individual gates applied to non-empty subsets of n-qubits, tensored with the identity on the remaining qubits.

Gates from an instruction set may be combined, each acting on different qubits, to construct circuits of depth one over n qubits. As such circuits will be integral to the disclosed algorithm, $V_{n,G}$, is defined as the set of all unitaries corresponding to depth one n-qubit circuits over the instruction set G. An n qubit circuit C over the instruction set G then has depth at most m if C corresponds to some sequence of unitaries $U_1 U_2 \ldots U_m$ where $U_1, U_2 \ldots, U_m$ are in $V_{n,G}$, Additionally, it is said that C implements a n-qubit unitary U if $U_1 U_2 \ldots U_m = U$.

The T-depth of a circuit is the number of stages (or unitaries $U_i$) where the T gate is the only non-Clifford gate. Since, in example embodiments, the main optimization criteria for circuits is to minimize T-depth, a given unitary is represented as U as $U=U_1 U_2 \ldots U_m$ where each $U_i$ has T-depth one. It has been shown (in or previous paper) that a decomposition of U is as follows:

$$U = e^{i\phi}\left(\prod_{i=m'}^{1} R(P_i)\right)C_0 \quad m' \geq m \qquad (1)$$

Now since at each stage or depth at most n T-gates can act on distinct qubits so it can be written:

$$U = e^{i\phi}\left(\prod_{i=m}^{1} V_i\right)C_0 \qquad (2)$$

where $V_i$ is the product of at most n consecutive $R(P_i)$ in Equation 1 such that in each R(Pdi) the T-gate acts in parallel on different qubits. Channel representation can also be used to write:

$$\hat{U} = \left(\prod_{i=m}^{1} \hat{V}_i\right)\hat{C}_0 \qquad (3)$$

Each $V_i$ as a stage or (parallel) block or partition and the R(P) s within each block can be called a "unit". Some properties or conditions for each such stage are derived in the following. A block $V_i$ as $V_{k,h}$ ($k \geq h$) if $V_i = R(P_k)R(P_{k-1}) \ldots R(P_h)$ is called k with h as the "start index" and "end index" of this block respectively. Note for n-qubit unitaries $k-h \leq n-1$. $(k-h+1)$ is the T-count of one such block. Expressing each R(P) in terms of Clifford+T gates, it can be written:

$$V_{k,h} = \prod_{j=k}^{h} R(P_j) = \prod_{j=k}^{h} D_j T_{(qj)} D_j^\dagger$$

$$= D_k T_{(qk)} D_k^\dagger D_{k-1} T_{(qk-1)} D_{k-1}^\dagger D_{k-2} T_{(qk-2)} D_{k-2}^\dagger \ldots D_h T_{(qh)} D_h^\dagger$$

To enable the T-gates to act in parallel there must be, for two separate qubits $q_j$ and $q_i$ (j not equal to I) there must be $[D_x^\dagger D_j, T_{(qj)}]=0$ [j not equal to k and k is the start index of a block or stage] (4).

Then it can be written:

$$V_{k,h} = D_k T_{(qK)} T_{(qk-1)} \ldots T_{(qh)} D_k^\dagger$$

Let $\mathbb{V}_n$ is the set if such blocks or stages of n-qubit unitaries. To derive a bound on the cardinality of this set is desired. Now a block $V_{k,h}$ as derived above can equivalently be written as:

$$V_{k,h} = (D_k T_{(qk)} D_k^\dagger)(D_k T_{(qk-1)} D_k^\dagger) \ldots (D_k T_{(qh)} D_k^\dagger).$$

Knowing given a Clifford $D_k$ and $T_{(qj)}$, a Pauli $P_j$ such that $D_k T_{(qK)} D_k^\dagger = R(P_j)$ can be found, i.e., each unit can be calculated. Thus, given a "start unit" and position of the T gate in all units, the block $V_{k,h}$ can be derived First calculate the possible number of blocks with a given start unit. The T-gate in this unit can be placed in any of the n qubits. Then the second unit T-gate has (n-1) choices and so on. Thus, the total number of ways T-gates can be placed is:

$$\sum_{j=1}^{n} P(n,j) = \sum_{j=1}^{n} \frac{n!}{(n-j)!} = n! \sum_{j=0}^{n-1} \frac{1}{j!} < e \cdot n!$$

Thus, number of T-depth 1 unitaries in $\mathbb{V}_n$ with a particular start unit is at most. $n!.2^n$.

Since there are $(N^2-1)=4^n-1$ possible choices for the start unit Pauli, so $|\mathbb{V}_n|$ is at most $e \cdot n! 8^n$.

Since the channel representation respects matrix multiplication, it is possible to derive the above observations while decomposing $\hat{U}$ into parallel blocks or stages. Thus (Fact 2.5):

$$|\mathbb{V}_n| \le e \cdot n! \cdot 2^{3n} \text{ and hence } \widehat{\mathbb{V}_{n F}} \le e \cdot n! \cdot 2^{3n}.$$

where the latter set is the set of channel representation of the unitaries in $\mathbb{V}_n$.

8. Reducing Both Space and Time Complexity to Find T-Depth Optimal Circuits

In this section a provable algorithm that finds a T-depth optimal circuit is described. This is an improvement over the algorithm by Amy et al. [AMMR13] that utilizes a meet-in-the-middle technique. A more space and time efficient algorithm that employs a nested meet-in-the-middle technique is devised, a modification which is similar in spirit to the one used for optimal T-count algorithm by Mosca and Mukhopadhyay [MM20]. Another crucial factor in reducing the complexity, is the use of channel representation of unitaries.

The following lemma which can be regarded as a generalization of the Lemma 1 in [AMMR13] is proved. This observation allows for searching for circuits of depth d by only generating circuits of depth at most d' where d' is the smallest integer that is greater than or equal to d/c (c≥2).

Lemma 3.1. Let $S_i$ be the set of all n-qubit unitaries that are implementable in depth i over the gate set G. Given a unitary U, there exists a circuit over G of depth $(d_1+d_2)$ implementing U if and only if the intersection of the sets $S_{d_1}^\dagger U$ and $S_{d_2}$ is non-empty.

The proposed procedure (Nested MITM) for depth-optimal circuit synthesis is now described, which has been outlined in Algorithm 1. The input consists of the unitary U, instruction set G, depth d and c≥2 that indicates the extent of nesting or recursion desired in the meet-in-the-middle approach. If U is of depth at most d then the output consists of a decomposition of U into smaller depth unitaries, else the algorithm indicates that U has depth more than d.

The algorithm consists of d' iterations (steps 3-17) and in the $i^{th}$ such iteration circuits of depth i ($S_i$) are generated by extending the circuits of depth i-1 ($S_{i-1}$) by one more level. Then these two sets are used to search for circuits of depth at most ci (steps 5-16). The search is performed iteratively where in the $k^{th}$ (1≤k≤c-1) round unitaries of depth at most ki are generated by taking k unitaries $V_1, V_2 \ldots, V_k$ where $V_i$ belongs to the set $S_i$ or $S_{i-1}$. Let $V=V_1 V_2 \ldots V_k$ and its depth is k'i. A unitary W in $S_i$ or $S_{i-1}$ is searched for such that $V^\dagger U=W$. By Lemma 3.1 if such a unitary is found it would imply that depth of U is k'i+i or k'i+i−1 respectively. In the other direction if the depth of U is either k'i+i or k'i+i−1 then there should exist such a unitary W in $S_i$ or $S_{i-1}$ respectively. Thus, if the depth of U is at most d then the algorithm terminates in one such iteration and returns a decomposition of U. This proves the correctness of this algorithm.

Time and Space Complexity

Imposing a strict lexicographic ordering on unitaries such that a set $S_i$ can be sorted with respect to this ordering in $O(|S_i| \log |S_i|)$ time and an element in this set in $O(\log |S_i|)$ time is searched for. An example of such an ordering is ordering two unitaries according to the first element in which they differ. Now consider the $i^{th}$ iteration of the while loop (steps 3-17) and k th iteration of the for loop (steps 5-16). Unitaries V of depth are built at most ki using elements from $S_i$ or $S_{i-1}$. Number of such unitaries is at most $|S_i|^k$. Given a V, time taken to search for W in $S_i$ or $S_{i-1}$ such that $V^\dagger U=W$ is O(log $[S_i]$). Since $|S_j| \le |V_{n,G}|^j$. so the $k^{th}$ iteration of the for loop within the $i^{th}$ iteration loop, takes time $O(V_{n,G}^{(c-1)i} \log [V_{n,G}])$. Thus, the time taken by the algorithm is $O(|V_{n,G}|^{(c-1)d'} \log [V_{n,G}])$.

In the algorithm unitaries of depth at most d' are stored. So, the space complexity of the algorithm is $O(|V_{n,G}|^{d'})$. Since $|V_{n,G}|$ is $O(|G|^n)$, the proposed algorithm has a space complexity $O([G]^{nd'})$ and time complexity $O(|G|^{n(c-1)d'} \log |G|)$.

8.1. A Provable Algorithm to Find T-Depth Optimal Circuits

Algorithm 1 (Nested MITM)—shown in FIG. 7, can be modified to search for circuits where optimality is given by some other criteria, like T-depth, especially for circuits over the Clifford+T gate set. In this case the instruction set G is the set of channel representations of $\mathbb{V}_n$, as described before. The detail of the procedure has been given in [GMM21].

Analyzing in the same way as before, it can be said that the algorithm has space complexity $O(((\dagger og\ N)!poly(N))^{d/c}$ and time complexity $\$O(\log N)!poly(N))^{(c-1)d/c}$. This is much less than the space and time complexity of the provable optimal T-depth algorithm in [AMMR13], which does not work with channel representations. This is primarily because of the fact that the cardinality of the n-qubit Clifford group is $O(2^{n^2})$[Ozo08], so the cardinality of the set of T-depth-1 unitaries that has to be generated at the beginning of the algorithm is much more than in the case of the disclosed approaches. A comparison has been given in Table 2. Both the time and space complexity of these MITM or Nested-MITM algorithms are functions of this set generated.

For example, consider 3-qubit unitaries. The Clifford group has 92,897,280 elements up to global phase [Ozo08]. The MITM algorithm of [AMMR13] generated more than 92,897,280 T-depth 1 3-qubit circuits before the searching procedure begins. The generation time itself takes more than 4 days [AMMR13]. In the proposed algorithm a set is generated whose cardinality is 2282 and takes 2.152 s to generate. Thus, even if the extent of nesting is 2 i.e., c=2, in which case the disclosed procedure becomes a MITM algorithm, there is a significant improvement in both time and space complexity.

TABLE 2

Comparison of pre-processing resources required by the algorithm and the algorithm in [AMMR13].

| #Qubits (n) | $|\mathbb{V}_n|$ | Generation time | $|\mathbb{V}_{n,\mathcal{G}}|$ | Generation time [AMMR13] |
|---|---|---|---|---|
| 2 | 122 | 0.014 s | 11520 | 1 s |
| 3 | 2282 | 2.152 s | 92,897,280 | ≈4 days |
| 4 | 35846 | 18 m 3 s | N/A | N/A |

9. A Heuristic Synthesis Algorithm to Find T-Depth Optimal Circuits

In this section a heuristic algorithm will be described that, on input a N×N unitary U, finds a T-depth optimal circuit for it and has time and space complexity poly (n!, N, d), where d is the minimum T-depth of U. The disclosed algorithm is inspired by the heuristic T-count algorithm in [MM20].

The input of the disclosed algorithm is the channel representation of a N×N unitary U (where $N=2^n$). It is known that decomposition of U and Û into parallel blocks or stages (Equation 2 and 3 in section 7.2 of this application), where each block has T-count at most n is possible. These blocks are elements in the set of channel representations of the unitaries in $\mathbb{V}_n$. Iteratively tries to guess the blocks (unitaries) by looking at the change in some "properties" of the matrix can be completed as follows:

$$\hat{V}_i^{-1} \hat{U}' \text{ where } \hat{U}' = \prod_{j=m}^{i+1} \hat{V}_j^{-1} \hat{U}.$$

If the correct sequence is found, a unitary which is the channel representation of some n-qubit Clifford matrix may be reached. This consists of exactly one +1 or −1 in each row and column. As in [MM20] (previous paper) two properties of the resultant matrices are considered-their sde and Hamming weight. First, consider the problem of deciding whether minimum T-depth of Û is some d'. Let us call it DECIDE T-DEPTH (Û, d') (arguments indicate the input).

It will be useful to depict the procedure using a tree (FIG. 8), where each node stores a unitary. The root (depth 0) stores. The edges are labeled by unitaries from the following set:

$$\mathbb{V}_n^{-1} = \{\hat{V}^{-1} : \hat{V} \in \widehat{\mathcal{V}_n}\}$$

Figure 8:
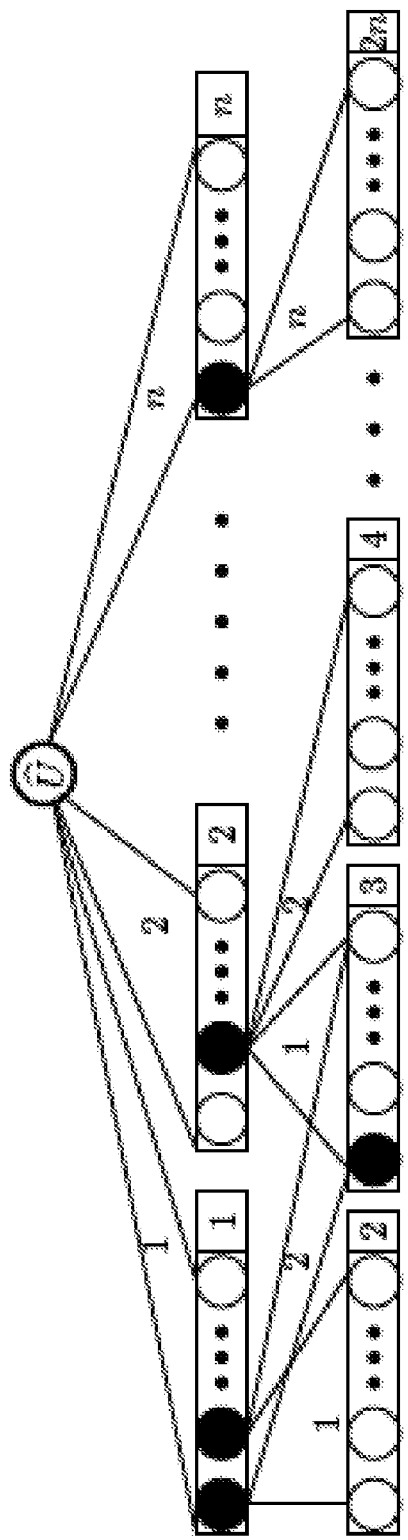
FIG. 8 illustrates a tree built in according to an example heuristic procedure.

This is a set of n-qubit unitaries with T-depth 1. A child node unitary is obtained by multiplying the parent unitary with the unitary of the edge. These two types of unitaries are referred to herein as "node-unitary" and "edge-unitary" respectively. The sequence of unitaries from the root to any non-root node unitary form a "path", the product of which is again a unitary and by "path T-count" (the T-count of this product is referred to as unitary). At each depth, the nodes are grouped into some "hypernodes" such that the path T-count of each node within a hypernode is same. At this point it will be useful to observe that:

$$\mathbb{V}_n^{-1} = \bigcup_{1 \leq j \leq n} \mathbb{V}_{n,j}^{-1},$$

where $\mathbb{V}_{n,j}^{-1}$ is the set of unitaries with T-depth 1 and T-count j. Note the union is disjoint. In FIG. 8 the edges are grouped such that the edge-unitaries within one such "hyperedge" are from $\mathbb{V}_{n,j}^{-1}$ for some j, i.e., they have the same T-count.

FIG. 8 illustrates the tree build in the heuristic procedure 2. Each node stores a unitary, the root at level 0 store Û $\mathbb{V}_n^{-1}$. The edges are labeled by unitaries in $V_n^{-1} \mathbb{V}_{n,j}^{-1}$, the set of unitaries with T-depth 1. A child node unitary is obtained by multiplying the edge unitary with the parent node unitary. The edges are grouped into hyper-edges, where each hyper-edge is labeled by a unitary $V_{n,j}^{-1}$, set of unitaries with T-depth 1 and T-count j. The nodes are grouped into hyper-nodes, where each hyper-node has a number indicating the number of T-gates in the path from the root to each node in this hyper-node. Within each hypernode some nodes are selected according to some criteria and the nodes in the next level are built from these selected (black) nodes.

In example embodiments, at each depth, within each such hypernode the nodes are subdivided according to the sde of its unitary and change in Hamming weight of this unitary compared to the parent node-unitary. Within each hypernode the set of nodes with minimum cardinality are selected such that sde of its unitaries can be reduced to 0 within depth do of the tree. The nodes are built in the next level from the "selected" node-unitaries only. Tree building is stopped as soon as a node-unitary with sde 0 is reached, indicating that a Clifford has been reached. If a Clifford is not reached within depth d', in example embodiments the process is quit, and it is concluded that minimum T-depth of U is more than d'. An outline has been given in Algorithm 2. Note the number of hypernodes in depth i can be at most ni−i+1, since the path T-count of any unitary can be at most ni and at least i. Also, since the sde can change by at most 1 after multiplying by a matrix which is inverse of the channel representation of R(P) (P is a non-identity n-qubit Pauli) then after multiplying by any unitary in $\mathbb{V}_{n,j}^{-1}$ sde of any unitary can change by at most j. So, at step 13 the minimum sized set among those sets of unitaries which has the potential to reach the Clifford within the remaining steps is selected.

To solve the optimization version of this problem, i.e., to find out the minimum T-depth of Û, trees of increasing depth are built until a tree where a Clifford node is reached is found. Specifically, many iterations of DECIDE T-DEPTH (Û,d') are solved, where d' increases by 1 in each iteration. The algorithm stops if it returns a depth at any iteration. The procedure (MIN T-DEPTH) has been outlined in Algorithm 3 shown in FIG. 10.

To analyze the space and time complexity of the disclosed algorithm the following conjecture is made.

Conjecture 1. While dividing the nodes according to their sde and change in Hamming weight within any hypernode, the minimum cardinality of any set (such that its sde can potentially reduce to 0) is bounded by poly (N).

Space and Time Complexity

The time and space complexity of DECIDE T-DEPTH (Algorithm 2 shown in FIG. 9) is now considered. From Fact 2.5 it is known that $|\mathbb{V}_n| \leq e \cdot n! N^2$. In example embodiments, these are the number of unitaries that are always stored.

In the $i^{th}$ iteration there are up to ni−i+1 children hypernodes. There are at most n(i−1)−(i−1)+1 parent hypernodes and within each at most poly(N) parent nodes are selected by Conjecture 1. Each parent node is multiplied by $|\mathbb{V}_n| N^2 \times N^2$ unitaries. Arguing in similar way space and time complexity of the algorithm DECIDE T-DEPTH is O(d, n, n!, $N^2$).

Since MIN T-DEPTH (Algorithm 3) consists of at most d iterations of DECIDE T-DEPTH, where d is the minimum T-depth of U, so space and time complexity is O(d, n, n!, $N^2$).

9.1. Implementations

The disclosed heuristic algorithm MIN-T-DEPTH was implemented in standard C++17 on an Intel (R) Core™ i-7700K CPU at 4.2 GHz, with 8 cores and 16 GB RAM, running Debian Linux 9.13. OpenMP was used for parallelization and the Eigen~3 matrix library for some of the matrix operations. The disclosed algorithm returns a T-depth-optimal decomposition of an input unitary.

T-depth-optimal circuits for 3 qubit benchmark circuits like Toffoli, Fredkin, Peres, Quantum OR, Negated Toffoli (Table 3) were synthesized. It was found the min-T-depth of all these circuits is 3, which is less than the T-depth known previously in [AMMR13] or any other paper cited herein. The authors in [AMMR13] did not perform a T-depth-optimal synthesis of these 3 qubit circuits, since their algorithm required to generate a (pre-processed) set of 92,897,280 elements, which took about 4 days (Table 2). The running time as well as space requirement, being an exponential (in min-T-depth) of this set, would have been intractable on a PC.

With an example implementation as descried herein, the set of 3 qubit unitaries that need to be generated has 2282 elements and takes 2.152 s (Table 2). The main bottleneck is the searching time, which takes about 27.5 m on average for the above 3 qubit gates. Thus, the disclosed algorithm clearly outperforms the best known T-depth-optimal synthesis algorithm in [AMMR13] or any other paper cited herein. It is also observed that the min-T-depth of an n-qubit unitary U will be at least the T-count of U divided by n. For all the unitaries in Table 3 the T-count is 7. Since the disclosed algorithm is a heuristic algorithm, this also verifies that whatever was obtained is optimal for these circuits.

TABLE 3

Performance of the disclosed algorithm on some benchmark circuit unitaries.

| Unitary | # qubits | T-depth | T-count | Optimal? | Time | Max #nodes | Prev T-depth |
|---|---|---|---|---|---|---|---|
| Toffoli | 3 | 3 | 7 | Yes | 27 m 41 s | 358 | 3[AMMR13] |
| Fredkin | 3 | 3 | 7 | Yes | 29 m 49 s | 358 | 4[AMMR13] |
| Peres | 3 | 3 | 7 | Yes | 27 m 36 s | 358 | 4[AMMR13] |
| Quantum OR | 3 | 3 | 7 | Yes | 27 m 35 s | 358 | 4[AMMR13] |
| Negated Toffoli | 3 | 3 | 7 | Yes | 27 m 12 s | 358 | 4[AMMR13] |

10. Data Structure

In this section data structures are designed that will make the algorithms and their implementation more efficient. Given the number of qubits one can calculate the R(P) and corresponding Sp for each n-qubit non-identity Pauli. Now it is possible to construct a $N^2 \times N^2$ matrix M which stores information about the commutation relations that is required. Denote this matrix as CR-matrix (commutation relation matrix) whose rows and columns are indexed by Paulis. The Paulis in the rows indicate the first unit of any block of R(P).

In the $(P_i, P_j)^{th}$ position pairs of values (k, l) are stored, which implies $[D_k^\dagger D_l, T_{(qI)}]=0$ where $D_k T_{(qK)} D_k^\dagger += R(P_i)$ and $D_l T_{(qI)} D_l^\dagger = R(P_j)$ and $q_k, q_l \in [n]$. In example embodiments, there is need to store at most n such pairs (for n possible values of $q_k$) in each matrix entry. According to some example embodiments, these pairs are stored by the first value.

According to further example embodiments, the following data structure can be used. For each n-qubit Pauli P there may be n arrays each of length $N^2$. Each array signifies one position of T-gate, i.e., possible value of $q_k$ as discussed above. In a way, the rows of M are separated. For each row there are n arrays of length $N^2$ for each possible value of $q_k$. For $P_j$ in the $k^{th}$ array l is stored at position $P_j$. This signifies the same thing as described above.

The time and space complexity for computing this data structure is poly (n,N). It not only becomes a handbook to check commutation relations, it can also compute some other information like the maximum T-count of a parallel T-depth 1 block such that starting unit at the beginning of this block is some R(P). This can be done in O(n) time.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the binary computer 100 or quantum computer 102, any component of or related thereto, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

This description contains headers to allow for ease of navigation throughout the application. These headers are not intended to identify key features or essential features of the claimed subject matter, nor are they intended to be used to limit the scope of the claimed subject matter.

Although the above principles have been described with reference to certain specific examples, various modifications thereof will be apparent to those skilled in the art as outlined in the appended claims.

The invention claimed is:

1. A method of synthesizing a quantum circuit for a plurality of qubits, comprising:
   initializing one or more target unitaries (U) as one or more input unitaries;
   iteratively determining one or more subsequent target unitaries by:
      executing a set of candidate operations (W) having a T-gate property via a channel representation function (f) for each of the one or more target unitaries (U);
      selecting one or more subsequent target unitaries based on values of the channel representation function (f) which satisfy one or more multiplicity criteria; and
   updating the one or more target unitaries (U) to include the selected one or more subsequent target unitaries.

2. The method of claim 1, where the candidate operations (W) are inverses of channel representations ($W^{-1}$), and the T-gate property is one of having a single T-gate or having a T-depth of one.

3. The method of claim 2, wherein the one or more multiplicity criteria are defined by channel representation function (f) values grouped by: (sde(U $W^{-1}$) increases), (sde(U $W^{-1}$) decreases), and (sde(U $W^{-1}$) is unchanged).

4. The method of claim 2, wherein the one or more multiplicity criteria are defined by channel representation function (f) values grouped by: (sde (U $W^{-1}$) increases, Hamming weight increases), (sde(U $W^{-1}$) increases, Hamming weight decreases), (sde(U $W^{-1}$) decreases, Hamming weight increases), (sde(U $W^{-1}$) decreases, Hamming weight decreases), (sde(U $W^{-1}$) is unchanged, Hamming weight decreases), (sde(U $W^{-1}$) is unchanged, Hamming weight increases).

5. The method of claim 2, wherein the one or more multiplicity criteria are defined by channel representation function (f) values grouped by: (sde(U $W^{-1}$) increases, Hamming weight increases), (sde(U $W^{-1}$) increases, Hamming weight decreases), (sde(U $W^{-1}$) decreases, Hamming weight increases), (sde(U $W^{-1}$) decreases, Hamming weight decreases), (sde(U $W^{-1}$) is unchanged, Hamming weight decreases), (sde(U $W^{-1}$) is unchanged, Hamming weight increases), (sde(U $W^{-1}$) is unchanged, Hamming weight is unchanged).

6. The method of claim 2, wherein the one or more multiplicity criteria are defined by channel representation function (f) values grouped by one or both of sde(U $W^{-1}$) and Hamming weights, and wherein the one or more subsequent target unitaries are selected based on channel representation function (f) value groups with a minimum cardinality.

7. The method of claim 6, wherein:
   the one or more subsequent target unitaries are determined for a target unitary count number of iterations; and
   the one or more subsequent target unitaries are selected based on channel representation function (f) value groups with sde(U $W^{-1}$) values that can reduce to zero for the remaining iterations.

8. The method of claim 1, wherein:
   the set of candidate operations (W) is computed in time (O) defined by ($N^4/2$), where N is a dimension of the set of candidate operations (W), and the set of candidate operations (W) are determined at least in part by copying half the rows of a respective candidate unitary matrix (V), and the remaining $N^2/2$ rows of the respective set of candidate operations W are determined by a component-wise addition or subtraction and multiplication among pairs of rows of the respective candidate unitary matrix (V).

9. The method of claim 1, wherein one or more target unitaries (U) are stored as a ring representation in a tuplet along with an sde value associated with the respective one or more target unitaries.

10. The method of claim 1, wherein the quantum circuit comprises Clifford and T-gate sets arranged according to the one or more target unitaries (U).

11. A system for synthesizing or re-synthesizing quantum circuits comprising a processor and memory, the memory comprising computer executable instructions that when executed by the processor, cause the processor to:
   initialize one or more target unitaries (U) as one or more input unitaries;
   recursively determine one or more subsequent target unitaries by:
      execute a set of candidate operations (W) having a T-gate property via a channel representation function (f) for each of the one or more target unitaries (U);
      select one or more subsequent target unitaries based on values of the channel representation function (f) which satisfy one or more multiplicity criteria; and
   update the one or more target unitaries (U) to include the one or more subsequent target unitaries.

12. The system of claim 11, where the candidate operations (W are inverses of channel representations ($W^{-1}$), and the T-gate property is one of having a single T-gate or having a T-depth of one.

13. The system of claim 11, wherein the one or more multiplicity criteria are defined by function (f) values grouped by: (sde(U $W^{-1}$) increases), (sde (U $W^{-1}$) decreases) and (sde(U $W^{-1}$) is unchanged).

14. The system of claim 11, wherein the one or more multiplicity criteria are defined by function (f) values grouped by: (sde(U $W^{-1}$) increases, Hamming weight increases), (sde(U $W^{-1}$) increases, Hamming weight decreases), (sde(U $W^{-1}$) decreases, Hamming weight increases), (sde(U $W^{-1}$) decreases, Hamming weight decreases), (sde(U $W^{-1}$) is unchanged, Hamming weight decreases), (sde(U $W^{-1}$) is unchanged, Hamming weight increases).

15. The system of claim 11, wherein the one or more multiplicity criteria are defined by function (f) values grouped by: (sde(U $W^{-1}$) increases, Hamming weight increases), (sde(U $W^{-1}$) increases, Hamming weight decreases), (sde(U $W^{-1}$) decreases, Hamming weight increases), (sde(U $W^{-1}$) decreases, Hamming weight decreases), (sde(U $W^{-1}$) is unchanged, Hamming weight decreases), (sde(U $W^{-1}$) is unchanged, Hamming weight increases), (sde(U $W^{-1}$) is unchanged, Hamming weight is unchanged).

16. The system of claim 11, wherein the one or more multiplicity criteria are defined by function (f) values grouped by one or both of sde(U $W^{-1}$) and Hamming weights, and wherein the one or more subsequent target unitaries are selected based on function (f) value groups with a minimum cardinality.

17. The system of claim 16, wherein:

the one or more subsequent target unitaries are determined for a target unitary count number of iterations; and the one or more subsequent target unitaries are selected based on function (f) value groups with sde(U W$^{-1}$) values that can reduce to zero for the remaining iterations.

18. The system of claim 17, wherein:

the set of candidate operations (W) is computed in time (O) defined by (N4/2), where N is a dimension of the set of candidate operations (W), and the set of candidate operations (W) are determined at least in part by copying half the rows of a respective candidate unitary matrix (V), and the remaining N2/2 rows of the respective set of candidate operations (W) are determined by a component-wise addition or subtraction and multiplication among pairs of rows of the respective candidate unitary matrix (V).

19. The system of claim 11, wherein one or more target unitaries (U) are stored as a ring in a tuplet along with an sde value associated with the respective one or more target unitaries.

20. A non-transitory computer readable medium comprising computer executable instructions for synthesizing a quantum circuit for a plurality of qubits, comprising instructions for:

initializing one or more target unitaries (U) as one or more input unitaries;

iteratively determining one or more subsequent target unitaries by:

executing a set of candidate operations (W) having a T-gate property via a channel representation function (f) for each of the one or more target unitaries (U);

selecting one or more subsequent target unitaries based on values of the channel representation function (f) which satisfy one or more multiplicity criteria; and updating the one or more target unitaries (U) to include the one or more subsequent target unitaries.

* * * * *